(12) United States Patent
Xie

(10) Patent No.: US 12,223,219 B2
(45) Date of Patent: Feb. 11, 2025

(54) SCREEN COMBINATION METHOD AND APPARATUS

(71) Applicant: Huawei Technologies Co., Ltd., Shenzhen (CN)

(72) Inventor: Zhiqiang Xie, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/264,517

(22) PCT Filed: Dec. 9, 2021

(86) PCT No.: PCT/CN2021/136884
§ 371 (c)(1),
(2) Date: Aug. 7, 2023

(87) PCT Pub. No.: WO2022/166395
PCT Pub. Date: Aug. 11, 2022

(65) Prior Publication Data
US 2024/0045638 A1 Feb. 8, 2024

(30) Foreign Application Priority Data
Feb. 8, 2021 (CN) .......................... 202110171975.0

(51) Int. Cl.
*G06F 3/14* (2006.01)
*G06F 3/01* (2006.01)
*G06T 7/70* (2017.01)

(52) U.S. Cl.
CPC .......... *G06F 3/1446* (2013.01); *G06F 3/017* (2013.01); *G06T 7/70* (2017.01)

(58) Field of Classification Search
CPC .......... G06F 3/1446; G06F 3/017; G06T 7/70
See application file for complete search history.

(56) References Cited

U.S. PATENT DOCUMENTS

| 2010/0144283 | A1* | 6/2010 | Curcio | .................... H04W 4/02 455/66.1 |
| 2014/0104139 | A1* | 4/2014 | Buchner | ................. G06F 3/147 345/1.3 |

(Continued)

FOREIGN PATENT DOCUMENTS

| CN | 102737616 B | 7/2015 |
| CN | 106445433 A | 2/2017 |

(Continued)

OTHER PUBLICATIONS

Wikipedia, Scale-invariant feature transform, 1999 (Year: 1999).*

(Continued)

*Primary Examiner* — Hang Lin
(74) *Attorney, Agent, or Firm* — Conley Rose, P.C.

(57) ABSTRACT

A method, implemented by a host of a screen splicing system, comprises sending, to a first screen of the screen splicing system, a first indication indicating the first screen to photograph a first image, sending, to a second screen of the screen splicing system, a second indication indicating the second screen to photograph a second image, and determining first orientation information of the first screen according to the first image and second orientation information of the second screen according to the second image.

20 Claims, 26 Drawing Sheets

(56) References Cited

U.S. PATENT DOCUMENTS

| | | |
|---|---|---|
| 2014/0359492 A1 | 12/2014 | Postal et al. |
| 2015/0009097 A1 | 1/2015 | Yang et al. |
| 2015/0091778 A1* | 4/2015 | Day .................. G16Z 99/00 |
| | | 345/1.3 |
| 2015/0169275 A1 | 6/2015 | Kim et al. |
| 2016/0133226 A1 | 5/2016 | Park et al. |
| 2018/0032301 A1* | 2/2018 | Jeacocke ............ G06F 3/1446 |
| 2020/0387783 A1* | 12/2020 | Bagherinezhad ........................ |
| | | G06F 16/90335 |

FOREIGN PATENT DOCUMENTS

| | | |
|---|---|---|
| CN | 106502603 A | 3/2017 |
| WO | 2017124524 A1 | 7/2017 |

OTHER PUBLICATIONS

Wikipedia, Speeded up robust features, 1999 (Year: 2006).*
Liu Wangshu, "Android MediaPlayer Architecture Diagram," Android, Development Language and Tools, Deep Open Source 1, Jan. 26, 2012, with the English Abstract, 6 pages.
Jiaweiluo, "Android audio and video playback—overall architecture," Jianshu, Jan. 17, 2019, with the English Abstract, 18 pages.
Eustoma, "Introduction to Android MediaPlayer Architecture," Blog Garden, Aug. 21, 2011, with the English Abstract, 15 pages.
Lu Jun, "Player Technology Sharing (1): Architecture Design," Zhihu, Dec. 2, 2018, with the English Abstract, 6 pages.
Qiu Jianjun, "Detailed Explanation of Live Video Technology Series 7: The Principles of Modern Players," blog, Nov. 17, 2016, with the English Abstract, 14 pages.

* cited by examiner (a)

(b)

SCREEN COMBINATION METHOD AND APPARATUS

CROSS-REFERENCE TO RELATED APPLICATIONS

This is a National Stage of International Patent Application No. PCT/CN2021/136884 filed on Dec. 9, 2021, which claims priority to Chinese Patent Application No. 202110171975.0 filed on Feb. 8, 2021. Both of the aforementioned applications are hereby incorporated by reference in their entireties.

TECHNICAL FIELD

This application relates to the terminal field, and in particular, to a screen combination method and an apparatus.

BACKGROUND

With the widespread application of network technologies, from the establishment of command and monitoring centers and network management centers, to the arrangement of temporary meetings and technical lectures, a large-screen display effect is needed. To achieve this effect, screens of a plurality of screened devices can be spliced together to provide a large-screen display effect.

When a plurality of screens are combined, position information and direction information of each screen need to be determined. Currently, the position information and the direction information of each screen may be manually input to a control host by a user. For example, in a scenario in which a plurality of displays are connected to a computer host for combination, a position of each display may be manually marked, so as to complete settings of a screen position and a direction relationship of the combination of the plurality of displays. As shown in FIG. 1A, on a settings interface, an orientation combination of a plurality of displays may be completed by manually dragging marked displays (by using a mouse or a touchscreen).

In the foregoing method, the position information and the direction information in the screen combination relationship need to be manually configured by the user, and a combination process is complex with cumbersome steps, resulting in poor user experience.

SUMMARY

Embodiments of this application provide a screen combination method and an apparatus, so that screen splicing can be automatically completed, thereby improving user experience.

According to a first aspect, an embodiment of this application provides a screen combination method which may be applied to a screen splicing system, where the screen splicing system includes at least two screens and a host, and the at least two screens include a first screen and a second screen, and the method includes: forming a first screen group by using the first screen and the second screen, where the first screen and the second screen are in communication connection; having the host send a first indication to the first screen and a second indication to the second screen; having the first screen photograph a first image according to the first indication, and having the second screen photograph a second image according to the second indication; and determining orientation information of the first screen and orientation information of the second screen respectively according to the first image and the second image.

Based on the method provided in this embodiment of this application, in a screen combination/splicing process, a relative orientation relationship between two devices may be identified based on an image (a photo) photographed by a device (the first screen or the second screen), and a user does not need to configure manually, thereby improving user experience.

In a possible implementation, the host is integrated into the first screen or the second screen; or the host is independent of the first screen or the second screen. For example, the first screen or the second screen may be a television. When the host is independent of the first screen or the second screen, the host may be a device such as a set-top box or a router. When the host is integrated into the first screen or the second screen, the host may be considered as a processing module in the first screen or the second screen.

In a possible implementation, determining orientation information of the first screen and orientation information of the second screen respectively according to the first image and the second image includes: the first screen sends the first image to the second screen; the second screen sends the second image to the first screen; the first screen determines its orientation information according to the first image, and the second screen determines its orientation information according to the second image; the first screen sends its determined orientation information to the host, and the second screen sends its determined orientation information to the host; and the host determines the orientation information of the first screen and of the second screen respectively according to the determined orientation information sent by the first screen and by the second screen. In some cases, information about an orientation relationship between some devices is redundant, and the information may not be used, or may be used as reference for verifying an identification result.

In a possible implementation, determining orientation information of the first screen and orientation information of the second screen respectively according to the first image and the second image includes: the first screen sends the first image to the host; the second screen sends the second image to the host; and the host determines the orientation information of the first screen and of the second screen respectively according to the first image and the second image. That is, the host may identify an orientation relationship between the devices in a screen group, not requiring another device (for example, the second screen) to identify orientation, so that power consumption of the another device can be reduced.

In a possible implementation, before forming the first screen group by using the first screen and the second screen, the method further includes: the first screen or the second screen sends the other a first short-range signal at a preset frequency, and the first screen or the second screen determines a distance between the first screen and the second screen according to a received signal strength indicator (RSSI) of the first short-range signal transmitted between the first screen and the second screen; and when the distance between the first screen and the second screen is less than or equal to a maximum combination radius corresponding to the first screen and the second screen, the first screen and the second screen form the first screen group, where the maximum combination radius corresponding to the first screen and the second screen is determined according to sizes of the first screen and the second screen and positions of antennas. In this way, the first screen and the second screen may determine, according to the first short-range signal, whether to perform screen combination. That is, the screen combination may be automatically performed, not requiring the user to perform complex operations, thereby improving user experience.

In a possible implementation, before forming the first screen group by using the first screen and the second screen, the method further includes: the first screen and/or the second screen display/displays first prompt information, where the first prompt information is used to inform the user that a nearby device is detected and prompt the user to determine whether to perform screen splicing; and the first screen and/or the second screen obtain/obtains a command of the user, where the command is used to confirm screen splicing. In this way, an operation of the user determines whether to perform screen combination, thereby avoiding an error caused by automatic triggering of screen combination.

In a possible implementation, determining orientation information of the first screen and orientation information of the second screen respectively according to the first image and the second image includes: performing image matching on the first image and the second image according to an image matching algorithm, to determine an overlapping area between the first image and the second image; and determining an orientation of the first screen relative to the second screen according to orientations of the overlapping area in the first image and in the second image. In this way, a relative orientation relationship between two devices (the first screen and the second screen) can be identified using the orientations of the overlapping area in different photos, not requiring the user's manual configuration, thereby improving user experience.

In a possible implementation, determining an orientation of the first screen relative to the second screen according to an orientation of the overlapping area in the first image includes: if the overlapping area is located in a lower half area of the first image and in an upper half area of the second image, determining that the first screen is located above the second screen; or if the overlapping area is located at a lower left corner of the first image and at an upper right corner of the second image, determining that the first screen is located to the upper right of the second screen; or if the overlapping area is located in a left half area of the first image and in a right half area of the second image, determining that the first screen is located to the right of the second screen; or if the overlapping area is located at an upper left corner of the first image and at a lower right corner of the second image, determining that the first screen is located to the lower right of the second screen; or if the overlapping area is located in an upper half area of the first image and in a lower half area of the second image, determining that the first screen is located below the second screen; or if the overlapping area is located at an upper right corner of the first image and at a lower left corner of the second image, determining that the first screen is located to the lower left of the second screen; or if the overlapping area is located in a right half area of the first image and in a left half area of the second image, determining that the first screen is located to the left of the second screen; or if the overlapping area is located in a lower right area of the first image and in an upper left area of the second image, determining that the first screen is located to the upper left of the second screen. In this way, a relative orientation relationship between two devices (the first screen and the second screen) can be identified using orientations of the overlapping area in different photos, not requiring the user's manual configuration, thereby improving user experience.

In a possible implementation, the image matching algorithm includes at least one of a scale-invariant feature transform (SIFT) algorithm, a speeded up robust features (SURF) algorithm, or a fast nearest neighbor search algorithm. Certainly, the image matching algorithm may be another algorithm, and this is not limited in this application.

In a possible implementation, determining orientation information of the first screen and orientation information of the second screen respectively according to the first image and the second image includes: if it is determined that the first image and the second image include a target object, determining an orientation of the first screen relative to the second screen according to orientations of the target object in the first image and in the second image, where the target object includes any one of a face, a human body movement, or a furniture item. In this way, a relative orientation relationship between two devices (the first screen and the second screen) can be identified using the orientations of the target object in different photos, not requiring the user's manual configuration, thereby improving user experience.

In a possible implementation, determining an orientation of the first screen relative to the second screen according to orientations of the target object in the first image and in the second image includes: if the target object is located in a lower half area of the first image and in an upper half area of the second image, determining that the first screen is located above the second screen; or if the target object is located at a lower left corner of the first image and at an upper right corner of the second image, determining that the first screen is located to the upper right of the second screen; or if the target object is located in the left half area of the first image and in the right half area of the second image, determining that the first screen is located to the right of the second screen; or if the target object is located at a lower left corner of the first image and at a lower right corner of the second image, determining that the first screen is located to the right of the second screen; or if the target object is located at an upper left corner of the first image and at an upper right corner of the second image, determining that the first screen is located to the right of the second screen; or if the target object is located at an upper left corner of the first image and at a lower right corner of the second image, determining that the first screen is located to the lower right of the second screen; or if the target object is located in the upper half area of the first image and in the lower half area of the second image, determining that the first screen is located below the second screen; or if the target object is located at an upper right corner of the first image and at a lower left corner of the second image, determining that the first screen is located to the lower left of the second screen; or if the target object is located in the right half area of the first image and in the left half area of the second image, determining that the first screen is located to the left of the second screen; or if the target object is located at a lower right corner of the first image and at a lower left corner of the second image, determining that the first screen is located to the left of the second screen; or if the target object is located at an upper right corner of the first image and at an upper left corner of the second image, determining that the first screen is located to the left of the second screen; or if the target object is located in a lower right area of the first image and in an upper left area of the second image, determining that the first screen is located to the upper left of the second screen. In this way, a relative orientation relationship between two devices (the first screen and the second screen) can be identified using the orientations of the target object in different photos, not requiring the user's manual configuration, thereby improving user experience.

In a possible implementation, before the first screen photographs a first image according to the first indication, and the second screen photographs the second image according to the second indication, the method further includes: the host sends layout information to the first screen and the second screen, where the layout information includes at least one combination mode; and the host sends operation information to the first screen and the second screen in response to an operation of selecting one combination mode from the at least one combination mode by the user, where the first screen and/or the second screen indicate/indicates, based on the operation information, the user to perform a first gesture or action in a first position and perform a second gesture or action in a second position. Determining orientation information of the first screen and orientation information of the second screen respectively according to the first image and the second image includes: if it is determined that an area that is in the first image and that includes the first gesture or action is greater than or equal to a preset threshold, determining that the first screen is located in the first position; or if it is determined that an area that is in the second image and that includes the second gesture or action is greater than or equal to the preset threshold, determining that the second screen is located in the second position. In this solution of determining an orientation of a device based on the gesture of the user, user experience regarding engagement and fun in a screen splicing process can be improved.

In a possible implementation, the host is integrated into the first screen or the second screen, the first screen and the second screen form the first screen group, and the method further includes: the first screen or the second screen scores resource statuses of the first screen and the second screen, where the resource statuses include at least one of a processing capability of a central processing unit (CPU), a storage capability of a read-only memory (ROM), or a storage capability of a random access memory (RAM); and if a score of the first screen is higher than a score of the second screen, the host is integrated into the first screen; or if the score of the second screen is higher than the score of the first screen, the host is integrated into the second screen. When the host is integrated into the first screen, it may be considered that the first screen is a master device; or when the host is integrated into the second screen, it may be considered that the second screen is a master device.

In a possible implementation, the method further includes: the host determines display information corresponding to the first screen and the second screen respectively according to the orientation information of the first screen and of the second screen; the host sends the display information corresponding to the first screen to the first screen; the first screen displays a corresponding display picture according to the display information corresponding to the first screen; the host sends the display information corresponding to the second screen to the second screen; and after receiving the display information corresponding to the second screen, the second screen displays a corresponding display picture according to the display information corresponding to the second screen. In this way, the first screen and the second screen may display a corresponding display picture according to the display information determined by the host, so that a large-screen display effect can be provided.

In a possible implementation, the screen splicing system further includes a third screen, and the method further includes: the first screen and the third screen send a second short-range signal to each other; the second screen and the third screen send a third short-range signal to each other; determining a distance between the first screen and the third screen according to an RSSI of the second short-range signal; determining a distance between the second screen and the third screen according to an RSSI of the third short-range signal; and when the distance between the first screen and the third screen is less than or equal to a maximum combination radius corresponding to the first screen and the third screen, forming a second screen group by using the first screen, the second screen, and the third screen, where the maximum combination radius corresponding to the first screen and the third screen is determined according to sizes of the first screen and the third screen and positions of antennas; or when the distance between the second screen and the third screen is less than or equal to a maximum combination radius corresponding to the second screen and the third screen, forming a second screen group by using the first screen, the second screen, and the third screen, where the maximum combination radius corresponding to the second screen and the third screen is determined according to sizes of the second screen and the third screen and positions of antennas. In this way, the first screen and the third screen may determine, according to the second short-range signal, whether to perform screen combination; or the second screen and the third screen may determine, according to the third short-range signal, whether to perform screen combination; and the user does not need to perform complex operations, thereby improving user experience.

In a possible implementation, the method further includes: the first screen and/or the second screen display second prompt information, where the second prompt information is used to inform the user that a nearby device is detected and prompt the user to determine whether to perform screen splicing; and the first screen and/or the second screen obtain an indication of the user, where the indication is used to confirm screen splicing. In this way, it may be determined, according to an operation of the user, whether to perform screen combination, thereby avoiding an error caused by automatic triggering of screen combination.

In a possible implementation, if the first condition is met, the method further includes: detecting, by the first screen and/or the second screen, whether a first condition is met; and if the first condition is met, removing, by the first screen and/or the second screen, the third screen from the second screen group. That is, the first screen or the second screen may automatically detect whether a screen (for example, the third screen) is removed, and then prompt the user, so that the user knows a status of the screen group at any time.

In a possible implementation, the first condition includes: a heartbeat connection between the third screen and the first screen is disconnected, or a heartbeat connection between the third screen and the second screen is disconnected; or the host receives an operation of deleting the third screen by the user; or the distance between the first screen and the third screen is greater than the maximum combination radius corresponding to the first screen and the third screen; or the distance between the second screen and the third screen is greater than the maximum combination radius corresponding to the second screen and the third screen.

In a possible implementation, the method further includes: the host re-determines the display information corresponding to the first screen and the display information corresponding to the second screen respectively according to the orientation information of the first screen and the orientation information of the second screen. That is, the host may adaptively adjust the display information of the screen group according to a change of a device in the screen group.

In a possible implementation, the method further includes: the host sends a third indication to the third screen, sends a fourth indication to the first screen, and sends a fifth indication to the second screen; the third screen photographs a third image according to the third indication; the first screen photographs a fourth image according to the fourth indication; the second screen photographs a fifth image according to the fifth indication; the third screen sends the third image to the host; the second screen sends the fifth image to the host; and after receiving the fourth image and the fifth image, the host determines the orientation information of the first screen, the second screen, and the third screen respectively according to the third image, the fourth image, and the fifth image. That is, when a device is newly added to the screen group, it may be considered that the screen group is regrouped, and each device in the screen group may re-photograph an image, so as to re-determine a relative orientation relationship between the devices in the screen group.

In a possible implementation, the third screen is removed from the second screen group, and the method further includes: the host sends a sixth indication to the first screen, and sends a seventh indication to the second screen; the first screen photographs a sixth image according to the sixth indication; the second screen photographs a seventh image according to the seventh indication; the first screen sends the sixth image to the host; the second screen sends the seventh image to the host; and the host determines the orientation information of the first screen and the second screen respectively according to the sixth image and the seventh image. That is, when a device removed from the screen group, it may be considered that the screen group is regrouped, and each device in the screen group may re-photograph an image, so as to re-determine a relative orientation relationship between the devices in the screen group.

According to a second aspect, an embodiment of this application provides a screen combination method, applied to a screen splicing system, where the screen splicing system includes at least two screens and a host, the at least two screens include a first screen and a second screen, the first screen and the second screen form a first screen group, and the first screen and the second screen are in communication connection, and the method includes: the host sends a first indication to the first screen, where the first indication is used to indicate the first screen to photograph a first image; the host sends a second indication to the second screen, where the second indication is used to indicate the second screen to photograph a second image; and the host determines the orientation information of the first screen and the orientation information of the second screen respectively according to the first image and the second image.

Based on the method provided in this embodiment of this application, in a screen combination/splicing process, a relative orientation relationship between two devices may be identified based on an image (a photo) photographed by a device (the first screen or the second screen), and a user does not need to perform manual setting, thereby improving user experience. In addition, in this embodiment of this application, a distance between devices may be dynamically monitored, an intention of combining the devices may be automatically identified, and a screen assembly program may be started, so that the user does not need to manually set the screen assembly program, which is more intelligent and convenient.

In a possible implementation, the host is integrated into the first screen or the second screen; or the host is independent of the first screen or the second screen.

In a possible implementation, the host determines the orientation information of the first screen and the orientation information of the second screen respectively according to the first image and the second image includes: the host receives the first image from the first screen; the host receives the second image from the second screen; and the host determines the orientation information of the first screen according to the first image, and determines the orientation information of the second screen according to the second image.

In a possible implementation, the determining orientation information of the first screen and orientation information of the second screen respectively according to the first image and the second image includes: the host performs image matching on the first image and the second image according to an image matching algorithm, to determine an overlapping area between the first image and the second image; and determining an orientation of the first screen relative to the second screen according to orientations of the overlapping area in the first image and the second image.

In a possible implementation, the determining an orientation of the first screen relative to the second screen according to an orientation of the overlapping area in the first image includes: if the overlapping area is located in a lower half area of the first image and is located in an upper half area of the second image, determining that the first screen is located above the second screen; or if the overlapping area is located at a lower left corner of the first image and is located at an upper right corner of the second image, determining that the first screen is located to the upper right of the second screen; or if the overlapping area is located in a left half area of the first image and is located in a right half area of the second image, determining that the first screen is located to the right of the second screen; or if the overlapping area is located at an upper left corner of the first image and is located at a lower right corner of the second image, determining that the first screen is located to the lower right of the second screen; or if the overlapping area is located in an upper half area of the first image and is located in a lower half area of the second image, determine that the first screen is located below the second screen, or if the overlapping area is located at an upper right corner of the first image and is located at a lower left corner of the second image, determining that the first screen is located to the lower left of the second screen; or if the overlapping area is located in a right half area of the first image and is located in a left half area of the second image, determining that the first screen is located to the left of the second screen; or if the overlapping area is located in a lower right area of the first image and is located in an upper left area of the second image, determining that the first screen is located to the upper left of the second screen.

In a possible implementation, the image matching algorithm includes at least one of a scale-invariant feature transform SIFT algorithm, a speeded up robust features SURF algorithm, or a fast nearest neighbor search algorithm.

In a possible implementation, the determining orientation information of the first screen and orientation information of the second screen respectively according to the first image and the second image includes: if it is determined that the first image and the second image include a target object, determining the orientation of the first screen relative to the second screen according to orientations of the target object in the first image and the second image.

In a possible implementation, before the first screen photographs a first image according to the first indication, and the second screen photographs the second image according to the second indication, the method further includes: the host sends layout information to the first screen and the second screen, where the layout information includes at least one combination mode; and the host sends operation information to the first screen and the second screen in response to an operation of selecting one combination mode from the at least one combination mode by the user, where the operation information is used to indicate the user to perform a first gesture or action in a first position and perform a second gesture or action in a second position. The determining orientation information of the first screen and orientation information of the second screen respectively according to the first image and the second image includes: if it is determined that an area that is in the first image and that includes the first gesture or action is greater than or equal to a preset threshold, determining that the first screen is located in the first position; or if it is determined that an area that is in the second image and that includes the second gesture or action is greater than or equal to the preset threshold, determining that the second screen is located in the second position.

In a possible implementation, the method further includes: the host determines display information corresponding to the first screen and display information corresponding to the second screen respectively according to the orientation information of the first screen and the orientation information of the second screen; the host sends the display information corresponding to the first screen to the first screen; and the host sends the display information corresponding to the second screen to the second screen.

For beneficial effects of the implementations in the second aspect, refer to beneficial effects of corresponding implementations in the first aspect. Details are not described herein again.

According to a third aspect, an embodiment of this application provides an electronic device. The electronic device may be a first screen or a second screen, and the electronic device includes a wireless communication module, a memory, and one or more processors. The wireless communication module and the memory are coupled to the processor. The memory is configured to store computer program code, and the computer program code includes computer instructions. When the computer instructions are executed by the processor, the electronic device is enabled to perform the method according to any one of the first aspect or the second aspect or the possible implementations of the first aspect or the second aspect.

According to a fourth aspect, an embodiment of this application provides a chip system, where the chip system includes one or more interface circuits and one or more processors. The interface circuit and the processor are interconnected by using a line. The chip system may be applied to an electronic device (for example, a first screen or a second screen) that includes a communication module and a memory. The interface circuit is configured to receive a signal from the memory and send the received signal to the processor, where the signal includes computer instructions stored in the memory. When the processor executes the computer instructions, the electronic device performs the method according to any aspect or the possible implementations of the aspect.

According to a fifth aspect, an embodiment of this application provides a computer-readable storage medium, where the computer-readable storage medium includes computer instructions. When the computer instructions are run on an electronic device (for example, a first screen or a second screen), the electronic device is enabled to perform the method according to any one of the first aspect or the possible implementations of the first aspect.

According to a sixth aspect, an embodiment of this application provides a computer program product. When the computer program product runs on a computer, the computer is enabled to perform the method according to any one of the first aspect or the second aspect or the possible implementations of the first aspect or the second aspect.

According to a seventh aspect, an embodiment of this application provides a software upgrade system, including a first screen, a second screen, and a host, where the first screen, the second screen, and the host may perform the method according to any one of the first aspect or the possible implementations of the first aspect.

DESCRIPTION OF EMBODIMENTS

This application provides a screen combination method. For a screened terminal device with a camera, a screen combination scenario can be automatically detected without using any other specific sensor or manual orientation configuration, and a relative orientation of a screen can be automatically calculated based on an orientation of an overlapping area of a picture taken by the camera, so as to complete a screen combination process, thereby providing a user with simple and intelligent screen splicing experience.

Figure 1A:
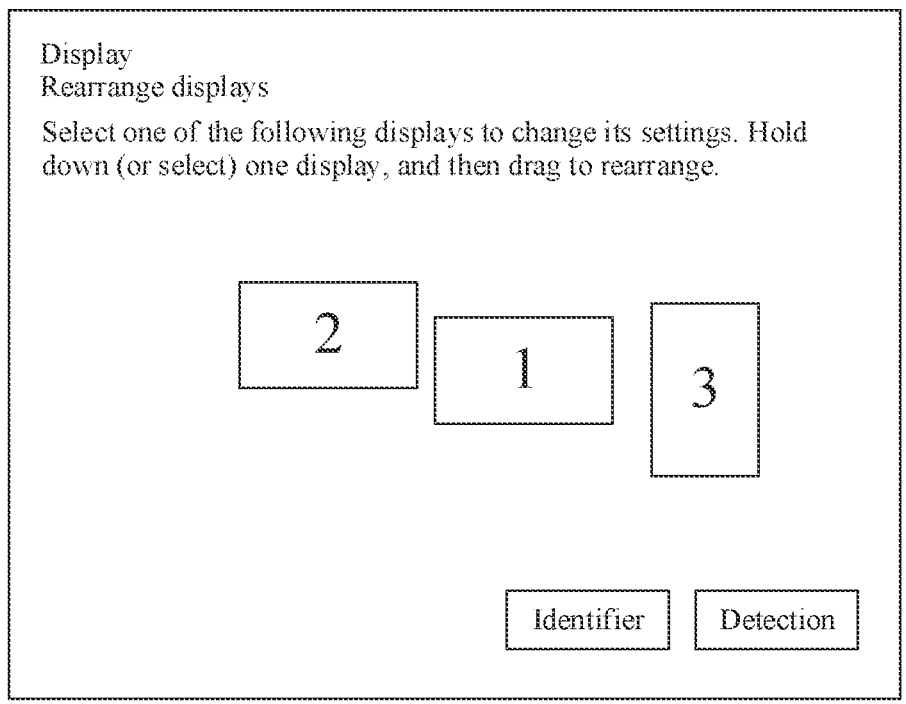
FIG. 1A is a schematic diagram of a screen combination display interface in a conventional technology.
Figure 1B:
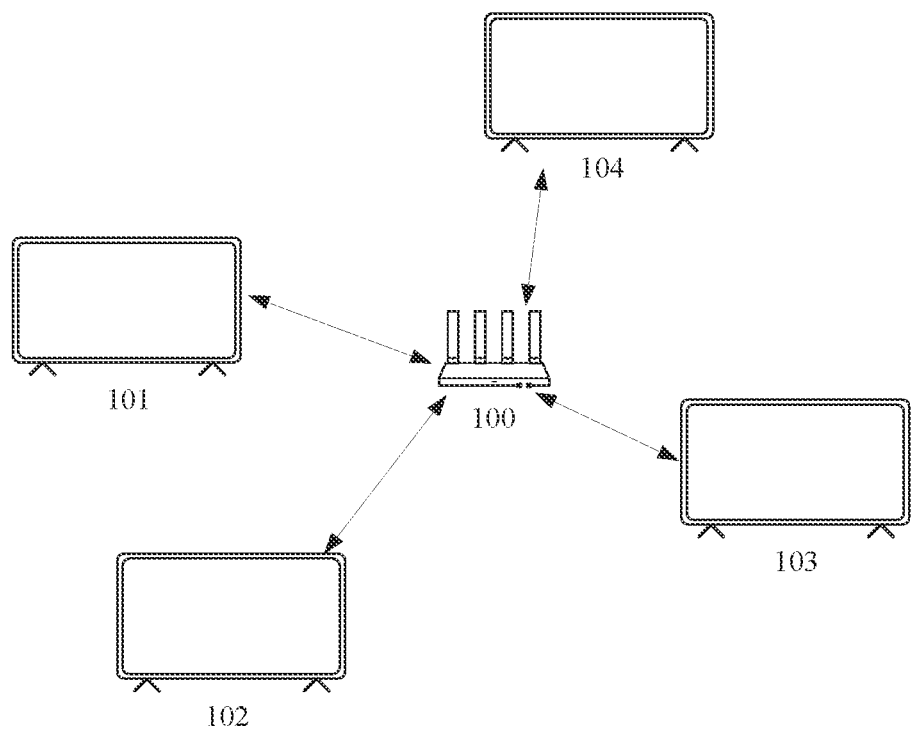
FIG. 1B is a schematic diagram of a system architecture according to an embodiment of this application.

FIG. 1B is a schematic diagram of an architecture of a screen splicing system according to an embodiment of this application. As shown in FIG. 1B, the system may include one or more electronic devices, for example, a router 100, a television 101, a television 102, a television 103, and a television 104. The television 101, the television 102, the television 103, and the television 104 may be connected to a same local area network (LAN) based on the router 100. Certainly, the screen splicing system may further include more electronic devices. This is not limited in this application.

Figure 1C:
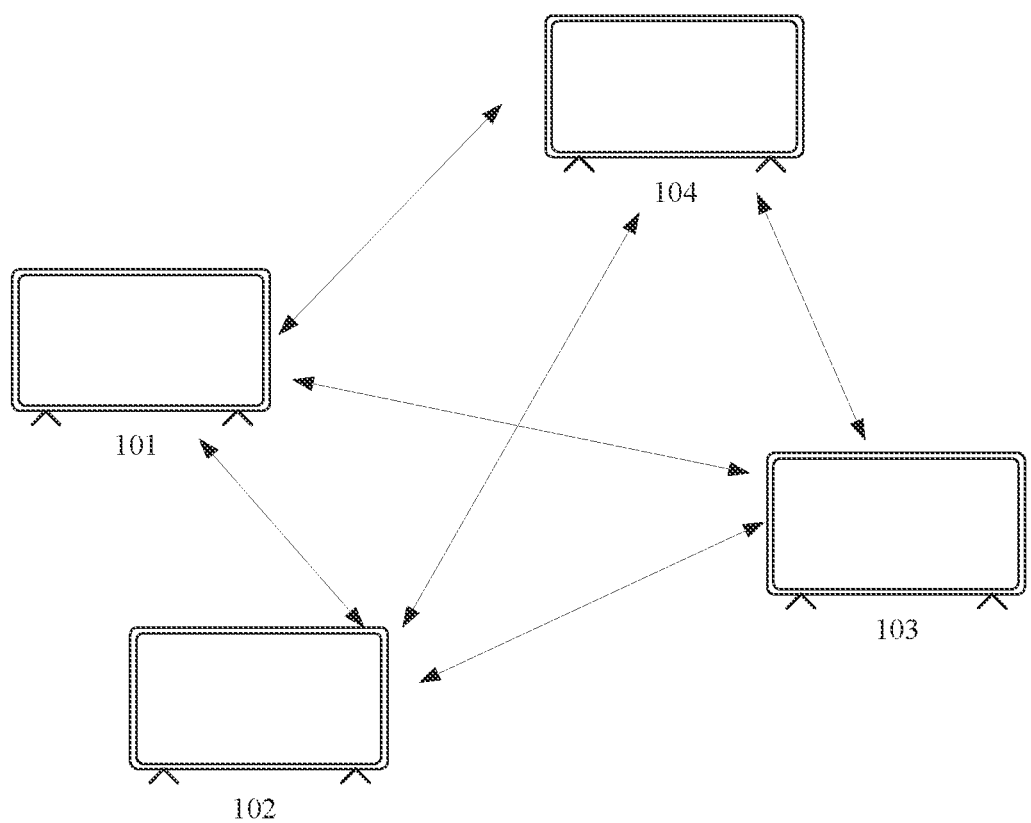
FIG. 1C is a schematic diagram of another system architecture according to an embodiment of this application.

FIG. 1C is a schematic diagram of an architecture of another screen splicing system according to an embodiment of this application. The system may include one or more electronic devices, for example, a television 101, a television 102, a television 103, and a television 104 as shown in FIG. 1C. Every two of the television 101, the television 102, the television 103, and the television 104 may be connected by using a short-range communication technology (for example, a Wi-Fi Direct technology or a Bluetooth technology). Certainly, the screen splicing system may further include more electronic devices. This is not limited in this application.

Figure 2A:
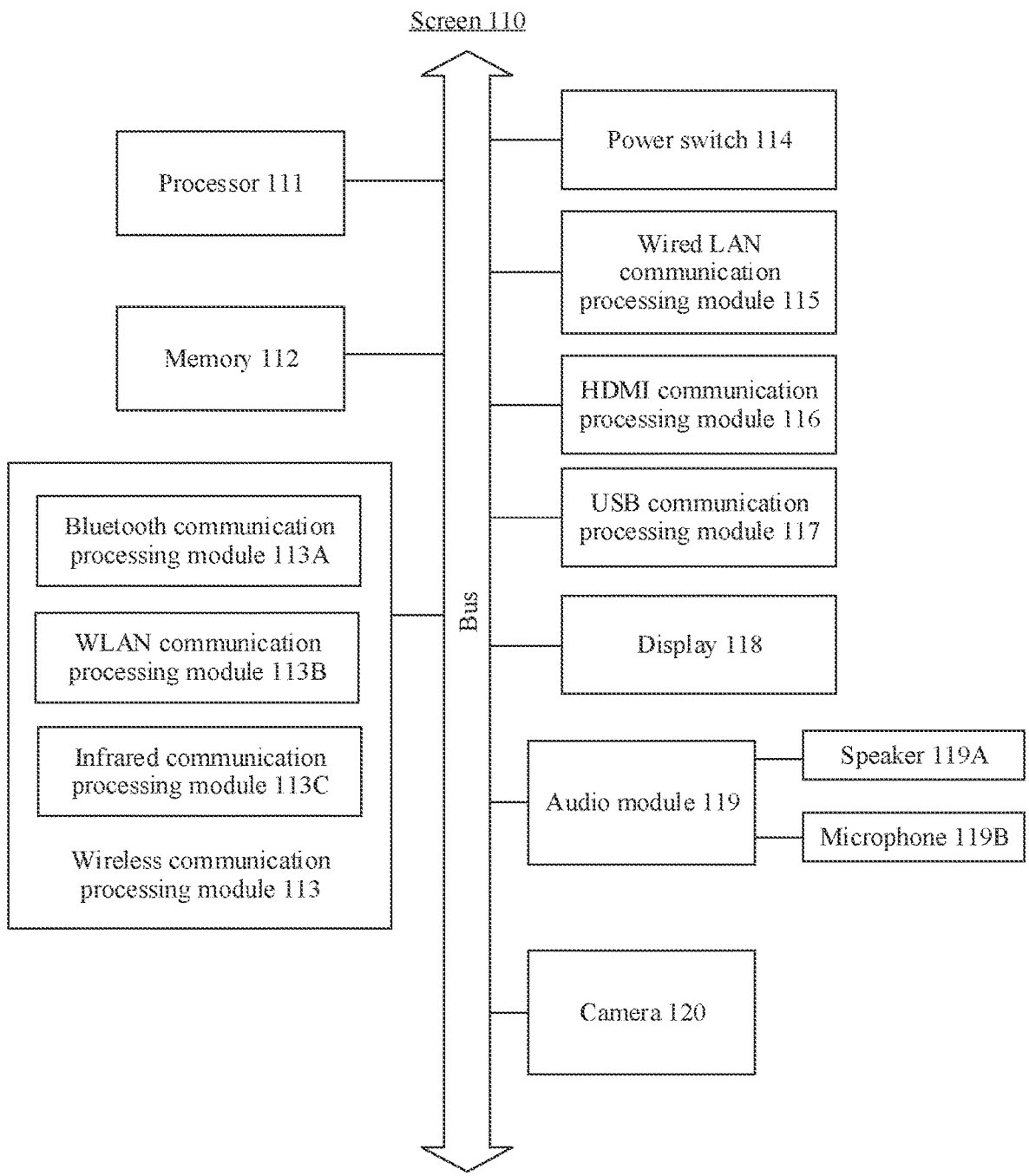
FIG. 2A is a schematic diagram of a hardware structure of an electronic device according to an embodiment of this application.

As shown in FIG. 2A, a television 101, a television 102, a television 103, or a television 104 may be a screen 110. The screen 110 may include, a processor 111, a memory 112, a wireless communication processing module 113, a power switch 114, a wired LAN communication processing module 115, an HDMI communication processing module 116, a universal serial bus (universal serial bus, USB) communication processing module 117, a display 118, an audio module 119, a speaker 119A, a microphone 119B, and the like.

The processor 111 may be configured to read and execute a computer-readable instruction. In specific implementation, the processor 111 may mainly include a controller, an arithmetic logical unit, and a register. The controller is mainly responsible for decoding an instruction and sending a control signal for an operation corresponding to the instruction. The arithmetic logical unit is mainly responsible for storing a register operand, an intermediate operation result, and the like that are temporarily stored during instruction execution. In specific implementation, a hardware architecture of the processor 111 may be an application-specific integrated circuit (ASIC) architecture, an MIPS architecture, an ARM architecture, an NP architecture, or the like.

In some embodiments, the processor 111 may be configured to parse a signal received by the wireless communication processing module 113 and/or a signal received by the wired LAN communication processing module 115. The processor 111 may be configured to perform a corresponding processing operation based on a parsing result, for example, respond to a data request, or control displaying of the display 118 and/or control output of the audio module 119 based on a control request.

In some embodiments, the processor 111 may be further configured to generate a signal sent by the wireless communication processing module 113 and/or a signal sent by the wired LAN communication processing module 115, for example, a Bluetooth broadcast signal or a beacon signal.

The memory 112 is coupled to the processor 111, and is configured to store various software programs and/or a plurality of sets of instructions. In specific implementation, the memory 112 may include a high-speed random access memory, or may include a non-volatile memory, such as one or more magnetic disk storage devices, a flash memory device, or another non-volatile solid-state storage device. The memory 112 may store an operating system, for example, an embedded operating system such as uCOS, VxWorks, or RTLinux. The memory 112 may further store a communication program, where the communication program may be used to communicate with another device.

The wireless communication processing module 113 may include a Bluetooth (BT) communication processing module 113A and a WLAN communication processing module 113B.

In some embodiments, one or more of the Bluetooth (BT) communication processing module 113A and the WLAN communication processing module 113B may listen to a signal transmitted by another device, for example, a probe request or a scanning signal, and may send a response signal, for example, a probe response or a scanning response, so that the another device can discover the screen 110, and establish a wireless communication connection to the another device, so as to communicate with the another device by using one or more of wireless communication technologies in Bluetooth or WLAN. The WLAN communication processing module 113B may provide a WLAN communication solution including one or more of Wi-Fi Direct, Wi-Fi LAN, and Wi-Fi SoftAP.

In some other embodiments, the one or more of the Bluetooth (BT) communication processing module 113A and the WLAN communication processing module 113B may alternatively transmit a signal, for example, a broadcast Bluetooth signal or a beacon signal, so that another device can discover the screen 110, and establish a wireless communication connection to the another device, so as to communicate with the another device by using one or more wireless communication technologies in Bluetooth or WLAN.

In some embodiments, the screen 110 may be connected to the Internet by using a WLAN wireless communication technology, to establish a communication connection to a server (for example, a channel identification server or a video-on-demand resource server) on the Internet.

The wireless communication processing module 113 may further include an infrared communication processing module 113C. The infrared communication processing module 113C may communicate with another device (for example, a remote control) by using an infrared remote control technology.

The power switch 114 may be configured to control a power supply to supply power to the display 118.

The wired LAN communication processing module 115 may be configured to communicate with another device in a same wired LAN by using the LAN, and may be further configured to connect to a WAN by using the wired LAN, and communicate with a device in the WAN.

The HDMI communication processing module 116 may be configured to communicate with a device such as a set-top box through an HDMI port. For example, the HDMI communication processing module 116 may receive, through the HDMI port, media content sent by the set-top box, and the like.

The USB communication processing module 117 may be configured to communicate with another device through a USB interface.

The display 118 may be configured to display an image, a video, and the like. The display 118 may be a liquid crystal display (liquid crystal display, LCD), an organic light-emitting diode (organic light-emitting diode, OLED) display, an active-matrix organic light emitting diode (active-matrix organic light emitting diode, AMOLED) display, a flexible light-emitting diode (flexible light-emitting diode, FLED) display, a quantum dot emitting diode (quantum dot emitting diode, QLED) display, or the like.

The audio module 119 may be configured to convert a digital audio signal into an analog audio signal for output, and may also be configured to convert an analog audio input into a digital audio signal. The audio module 119 may be further configured to encode and decode an audio signal. In some embodiments, the audio module 119 may be disposed in the processor 111, or some functional modules in the audio module 119 are disposed in the processor 111. The audio module 119 may transmit an audio signal to the wireless communication module 113 through a bus interface (for example, a UART interface), to implement a function of playing the audio signal through a Bluetooth speaker.

The speaker 119A may be configured to convert an audio signal sent by the audio module 119 into a sound signal.

In some embodiments, the screen 110 may further include a microphone 119B, which is also referred to as a "mike" or a "mic", and is configured to convert a sound signal into an electrical signal. When sending a voice control instruction, a user may make a sound through the mouth, to input a sound signal to the microphone 119B.

The camera 120 may be configured to capture a still image or a video.

It may be understood that the screen 110 may have more or fewer components than those shown in FIG. 2A, may combine two or more components, or may have different component configurations. Components shown in FIG. 2A may be implemented by hardware including one or more signal processing or application-specific integrated circuits, software, or a combination of hardware and software.

Figure 2B:
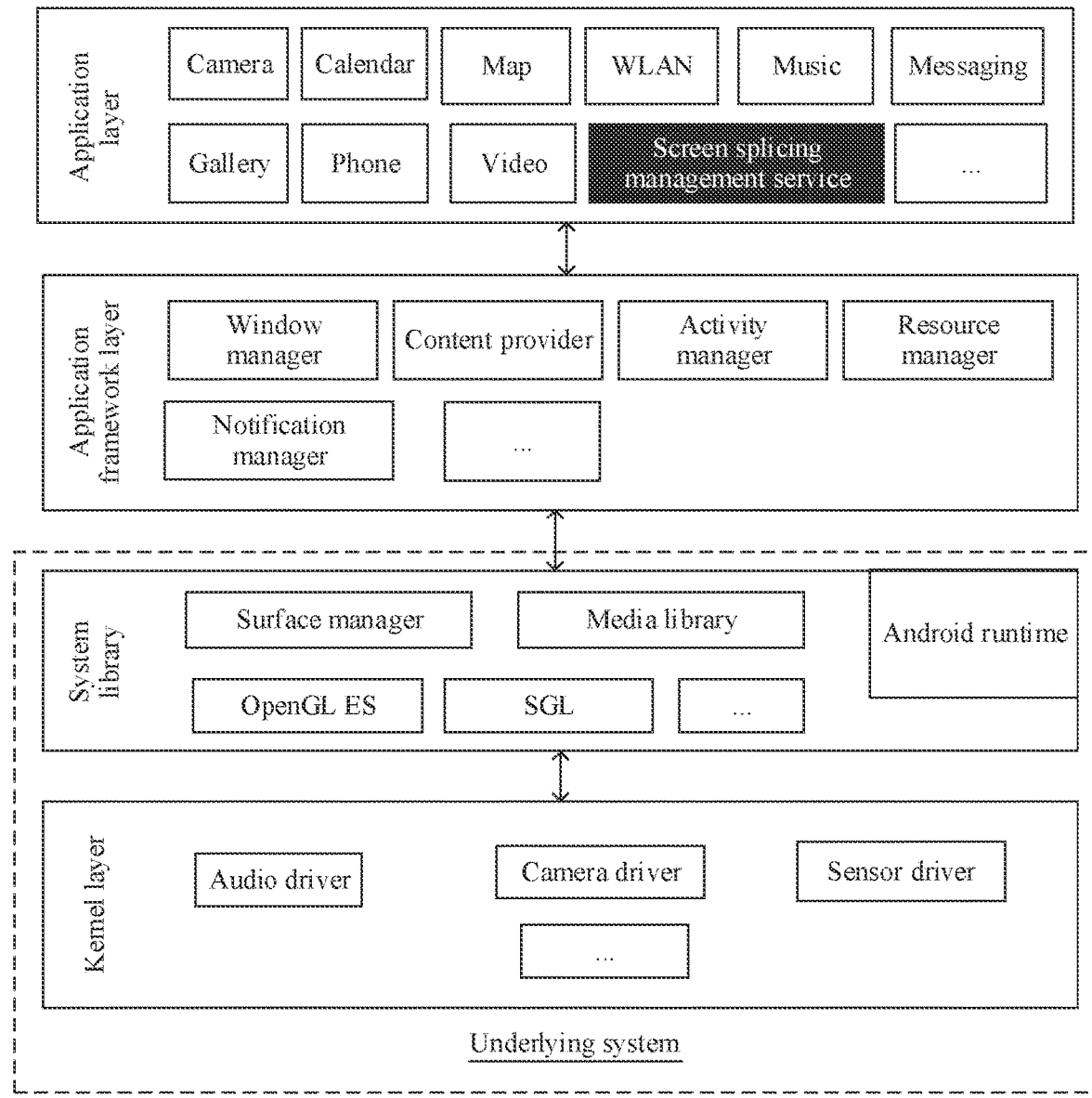
FIG. 2B is a schematic diagram of a software architecture of an electronic device according to an embodiment of this application.

As shown in FIG. 2B, application packages may include applications such as Camera, Gallery. Calendar, Phone, Map, Navigation, WLAN, Bluetooth, Music, Video, and Messaging.

In this embodiment of this application, an application layer may further include a screen splicing management service, and the screen splicing management service is used to manage screen splicing (screen combination) between a plurality of devices. The screen splicing management service may be integrated into a system app or a third-party app, for example, an AI Life app, a smart interconnection app, or a setting app. This is not limited in this application.

An application framework layer provides an application programming interface (application programming interface, API) and a programming framework for an application at the application layer. The application framework layer includes some predefined functions.

As shown in FIG. 2B, the application framework layer may include an activity manager, a window manager, a content provider, a view system, a resource manager, a notification manager, and the like. This is not limited in this embodiment of this application.

The activity manager (Activity Manager) is used to manage a lifecycle of each application. An application usually runs in an operating system in a form of an activity. For each activity, there is a corresponding application record (ActivityRecord) in the activity manager, and the ActivityRecord records a status of the activity of the application. The activity manager may use the ActivityRecord as an identifier to schedule an activity process of the application.

The window manager (WindowManagerService) is used to manage a graphical user interface (graphical user interface, GUI) resource used on a display, and may be specifically used to: obtain a display resolution, create and destroy a window, display and hide a window, arrange a window, manage a focus, manage an input method and wallpaper, and the like.

The system library and the kernel layer below the application framework layer may be referred to as an underlying system, and the underlying system includes an underlying display system for providing a display service. For example, the underlying display system includes a display driver at the kernel layer, a surface manager in the system library, and the like.

The content provider is used to store and obtain data, and enable the data to be accessed by an application. The data may include a video, an image, audio, calls that are made and answered, a browsing history and bookmarks, an address book, and the like. The view system includes visual controls such as a control for displaying a text and a control for displaying a picture. The view system may be used to construct an application. A display interface may include one or more views. For example, a display interface including an SMS message notification icon may include a text display view and a picture display view. The resource manager provides various resources for an application such as a localized character string, an icon, a picture, a layout file, and a video file. The notification manager enables an application to display notification information in a status bar, and may be used to convey a notification message. The notification manager may automatically disappear after a short pause without requiring a user interaction. For example, the notification manager is used to notify download completion, provide a message notification, and the like. The notification manager may alternatively be a notification that appears in a top status bar of the system in a form of a graph or a scroll bar text, for example, a notification of an application that runs on a background, or may be a notification that appears on the screen in a form of a dialog window. For example, text information is prompted in the status bar, an alert sound is played, the terminal vibrates, or the indicator light blinks.

As shown in FIG. 2B, the Android runtime includes a core library and a virtual machine. The Android runtime is responsible for scheduling and management of the Android system. The core library includes two parts: a function that needs to be called in Java language and a core library of Android. The application layer and the application framework layer run on the virtual machine. The virtual machine executes Java files of the application layer and the application framework layer as binary files. The virtual machine is used to implement functions such as object lifecycle management, stack management, thread management, security and abnormality management, and garbage collection.

As shown in FIG. 2B, the system library may include a plurality of functional modules, for example, a surface manager (surface manager), a media library (Media Library), an OpenGL ES, and an SGL.

The surface manager is used to manage a display subsystem and provide fusion of 2D and 3D layers for a plurality of applications.

The media library supports playback and recording in a plurality of commonly used audio and video formats, still image files, and the like. The media library may support a plurality of audio and video encoding formats such as MPEG-4, H.264, MP3, AAC, AMR, JPG, and PNG.

The OpenGL ES is used to implement three-dimensional graphics drawing, image rendering, composition, layer processing, and the like.

The SGL is a drawing engine for 2D drawing.

As shown in FIG. 2B, the kernel layer is a layer between hardware and software. The kernel layer includes at least a display driver, a camera driver, an audio driver, and a sensor driver.

Figure 3A:
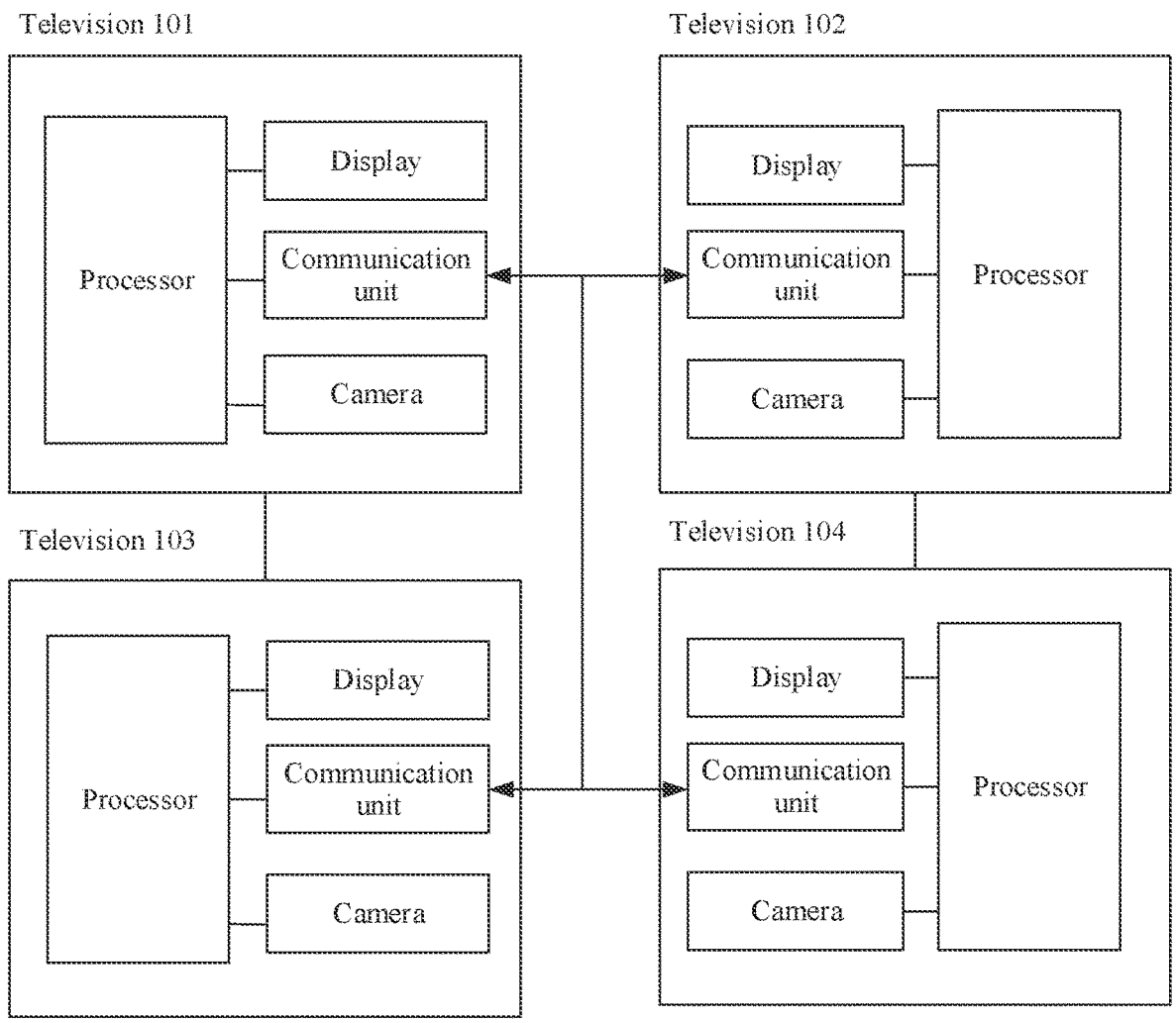
FIG. 3A is a schematic diagram of connection between a plurality of devices according to an embodiment of this application.

FIG. 3A is a schematic diagram of connection between a television 101, a television 102, a television 103, and a television 104 is provided. The television 101, the television 102, the television 103, and the television 104 each may include hardware modules such as a processor, a display, a camera, and a communication unit. The television 101, the television 102, the television 103, and the television 104 may be connected to each other by using a communication unit, so as to perform communication.

Figure 3B:
FIG. 3B is another schematic diagram of connection between a plurality of devices according to an embodiment of this application.

FIG. 3B is another schematic diagram of connection between a television 101, a television 102, a television 103, and a television 104. The television 101, the television 102, the television 103, and the television 104 each may include an application layer, an application framework layer, an Android runtime and system library, and a kernel layer. In this embodiment of this application, screen splicing may be automatically performed between the television 101, the television 102, the television 103, and the television 104 by using a screen splicing management service.

The following describes technical solutions in the embodiments of this application with reference to accompanying drawings in the embodiments of this application. In the description of this application, unless otherwise specified, "at least one" means one or more, and "plurality" means two or more. In addition, to clearly describe the technical solutions in the embodiments of this application, terms such as "first" and "second" are used in the embodiments of this application to distinguish between same items or similar items that provide basically same functions or purposes. A person skilled in the art may understand that the words such as "first" and "second" do not limit a quantity or an execution sequence, and the words such as "first" and "second" do not indicate a definite difference.

For ease of understanding, the following describes screen combination methods provided in embodiments of this application in detail with reference to the accompanying drawings.

Figure 3C:
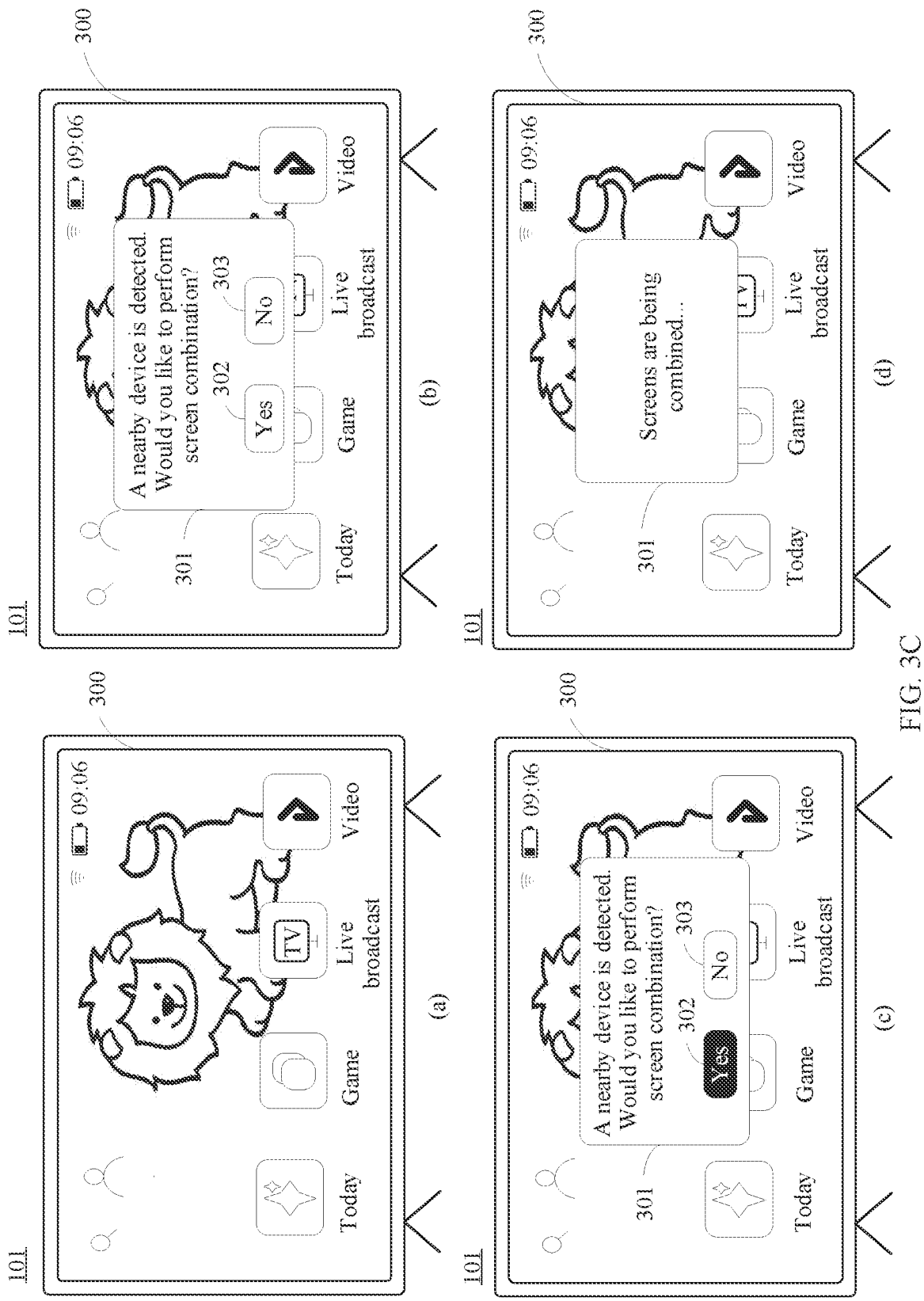
FIG. 3C is a schematic diagram of displaying according to an embodiment of this application.

As shown in (a) in FIG. 3C, a home screen 300 of the television 101 is shown. When the television 101 determines that a distance D1 between the television 101 and the television 102 is less than or equal to a maximum combination radius R1 corresponding to the television 101 and the television 102 (for a concept of the maximum combination radius, refer to related descriptions of step 406a below), as shown in (b) in FIG. 3C, the television 101 may display a pop-up box 301 to inform the user that a nearby device is detected. The pop-up box 301 may include a Yes button 302 and a No button 303, so that the user can select whether to perform screen combination. As shown in (c) in FIG. 3C, in response to an operation of clicking the Yes button 302 (for example, clicking the button 302 by using a remote control or a touchscreen) by the user, as shown in (d) in FIG. 3C, the user may be prompted that screen combination is being performed.

Figure 3D:
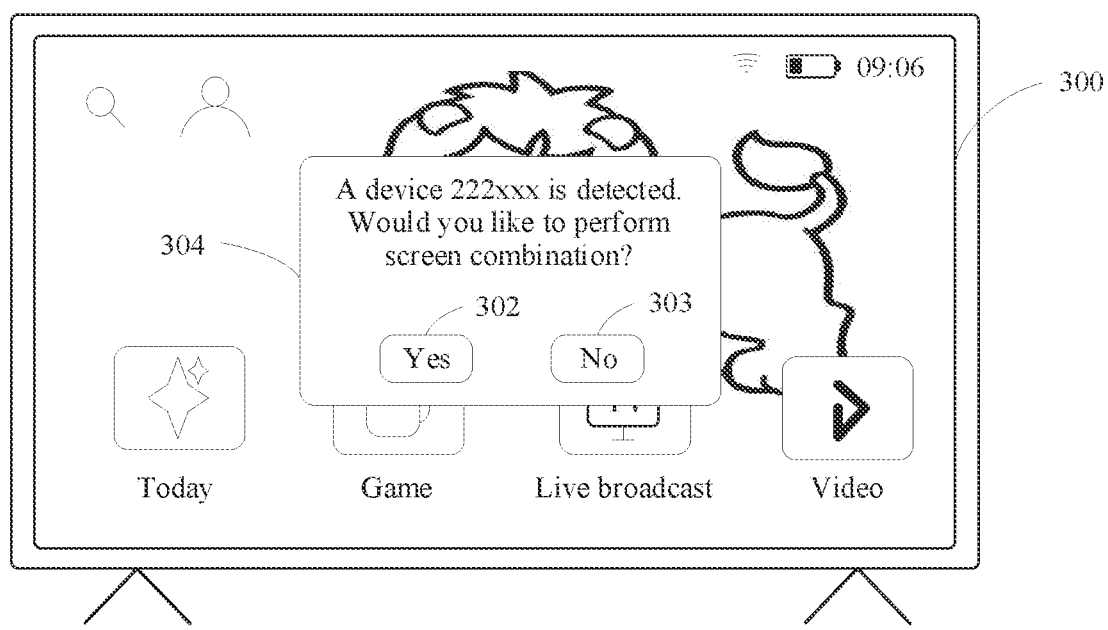
FIG. 3D is another schematic diagram of displaying according to an embodiment of this application.

Optionally, the television 101 may also prompt the user with an identifier or an ID of the nearby device. For example, as shown in FIG. 3D, the television 101 may display a pop-up box 304 to inform the user that a nearby device 222xxx (222xxx is an ID of the television 102) is detected. The pop-up box 304 may include a Yes button 302 and a No button 303, so that the user can select whether to perform screen combination on a current device and a television in a living room.

Figure 3E:
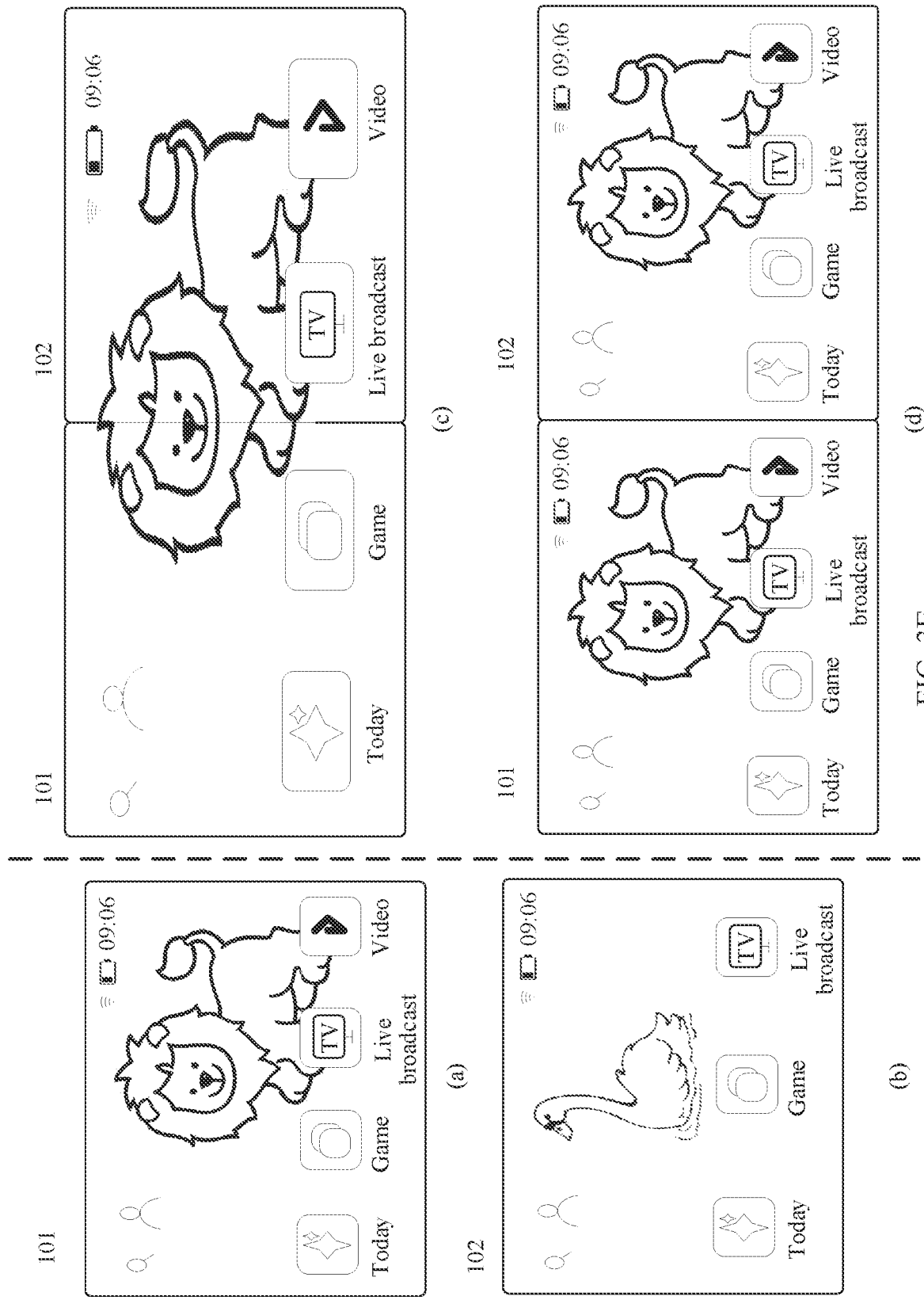
FIG. 3E is another schematic diagram of displaying according to an embodiment of this application.

It is assumed that display content of the television 101 and display content of the television 102 before splicing are respectively shown in (a) and (b) in FIG. 3E. After screen splicing is performed, as shown in (c) in FIG. 3E, the television 101 and the television 102 may jointly display a desktop of the television 101 (for example, the television 101 is a master device, and for a process of determining the master device, refer to related descriptions of step 409 below); or as shown in (d) in FIG. 3E, the television 101 and the television 102 may separately display a desktop of the television 101.

In some embodiments, if a television 103 is newly added to a screen group (for example, a first screen group) including the television 101 and the television 102 (that is, when the television 101 is spliced with the television 102, the newly added television 103 needs to be further spliced with the television 101 and the television 103). For example, as shown in (a) in FIG. 3F, the television 103 may gradually approach the screen group including the television 101 and the television 102; and then as shown in (b) in FIG. 3F, the television 101 and the television 102 each may display a pop-up box 305 to inform the user that a device 123xxx (123xxx is an ID of the television 103) is detected. The pop-up box 305 may include a Yes button 302 and a No button 303, so that the user can select whether to add the device to the screen group. Optionally, the television 103 may also prompt the user with an identifier or an ID of a nearby device. For example, the television 103 may display a pop-up box 306 to inform the user that a device 111xxx (111xxx may be an ID of the television 101) is detected. The pop-up box 306 may include a Yes button 302 and a No button 303, so that the user can select whether to perform screen combination. In response to an operation of clicking the Yes button 302 by the user, as shown in (c) in FIG. 3F, the television 101, the television 102, and the television 103 may form a new screen group (for example, a second screen group).

Figure 3F:
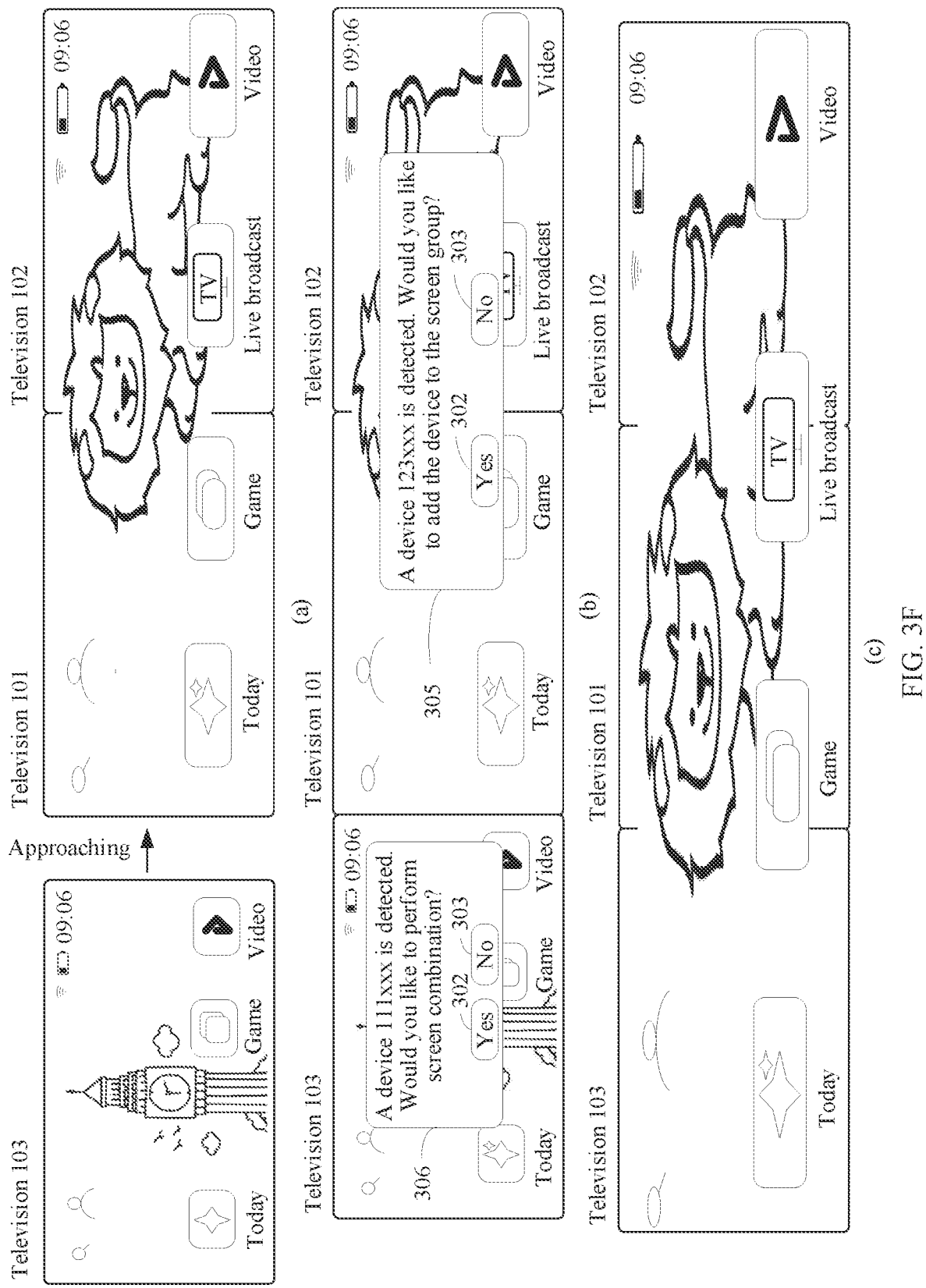
FIG. 3F is another schematic diagram of displaying according to an embodiment of this application.
Figure 3G:
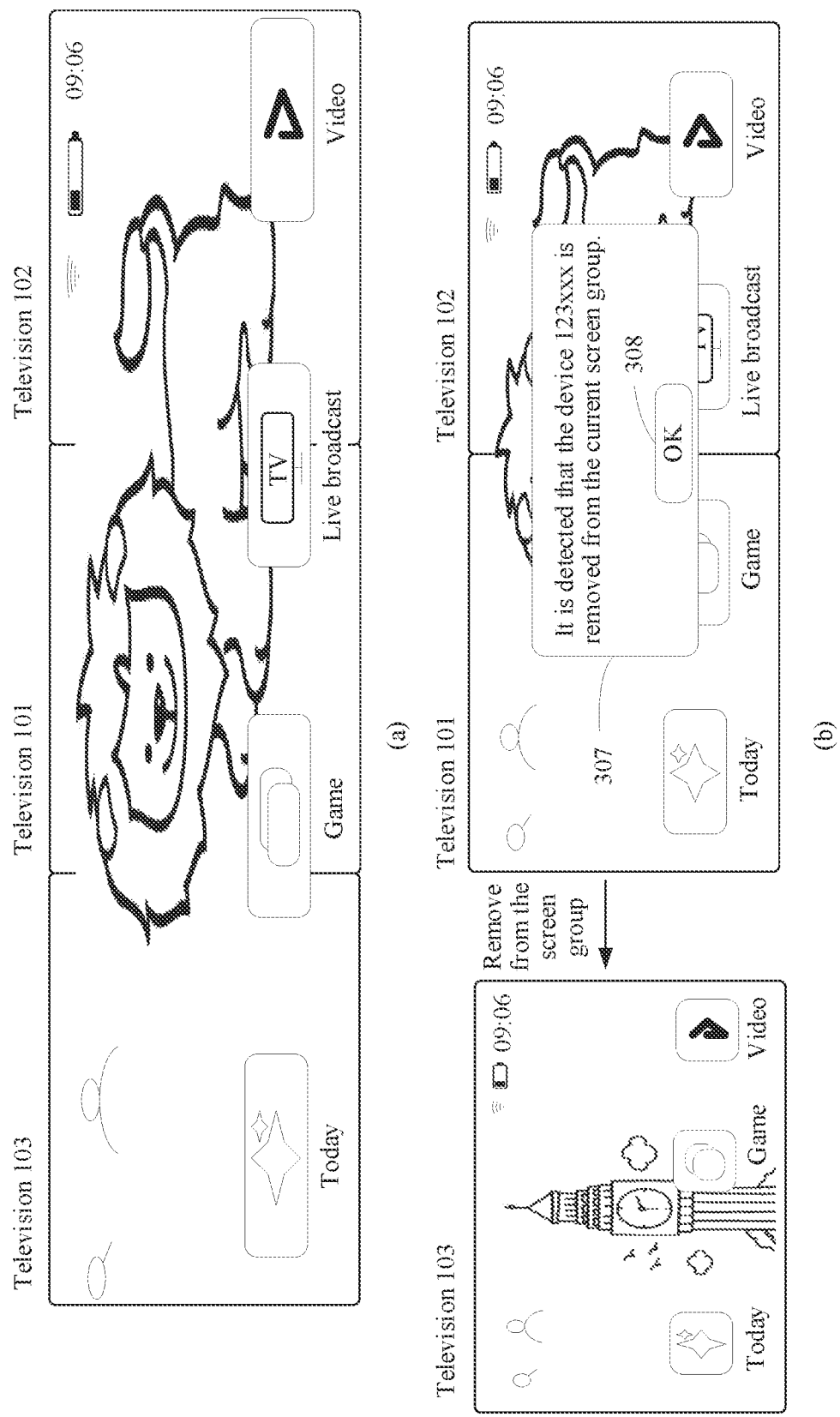
FIG. 3G is another schematic diagram of displaying according to an embodiment of this application.

In some embodiments, as shown in (a) in FIG. 3G, the screen group including the television 101, the television 102, and the television 103 may jointly display corresponding display content. If the television 103 needs to be deleted from the screen group including the television 101, the television 102, and the television 103 (for example, the television 103 is removed after the television 101, the television 102, and the television 103 are spliced together), for example, as shown in (b) in FIG. 3G, the television 101 and the television 102 each may display a pop-up box 307 to inform the user that it is detected that the device 123*xxx* has been removed from the current screen group. The pop-up box 307 may include an OK button 308. In response to an operation of clicking the OK button 308 by the user, the television 101 determines that information in the pop-up box 307 is known to the user, and may hide the pop-up box 307. Alternatively, the pop-up box 307 may be automatically hidden after being displayed for a few seconds (for example, 2 s), to avoid affecting the display content of the television 101 and the television 102.

Figure 3H:
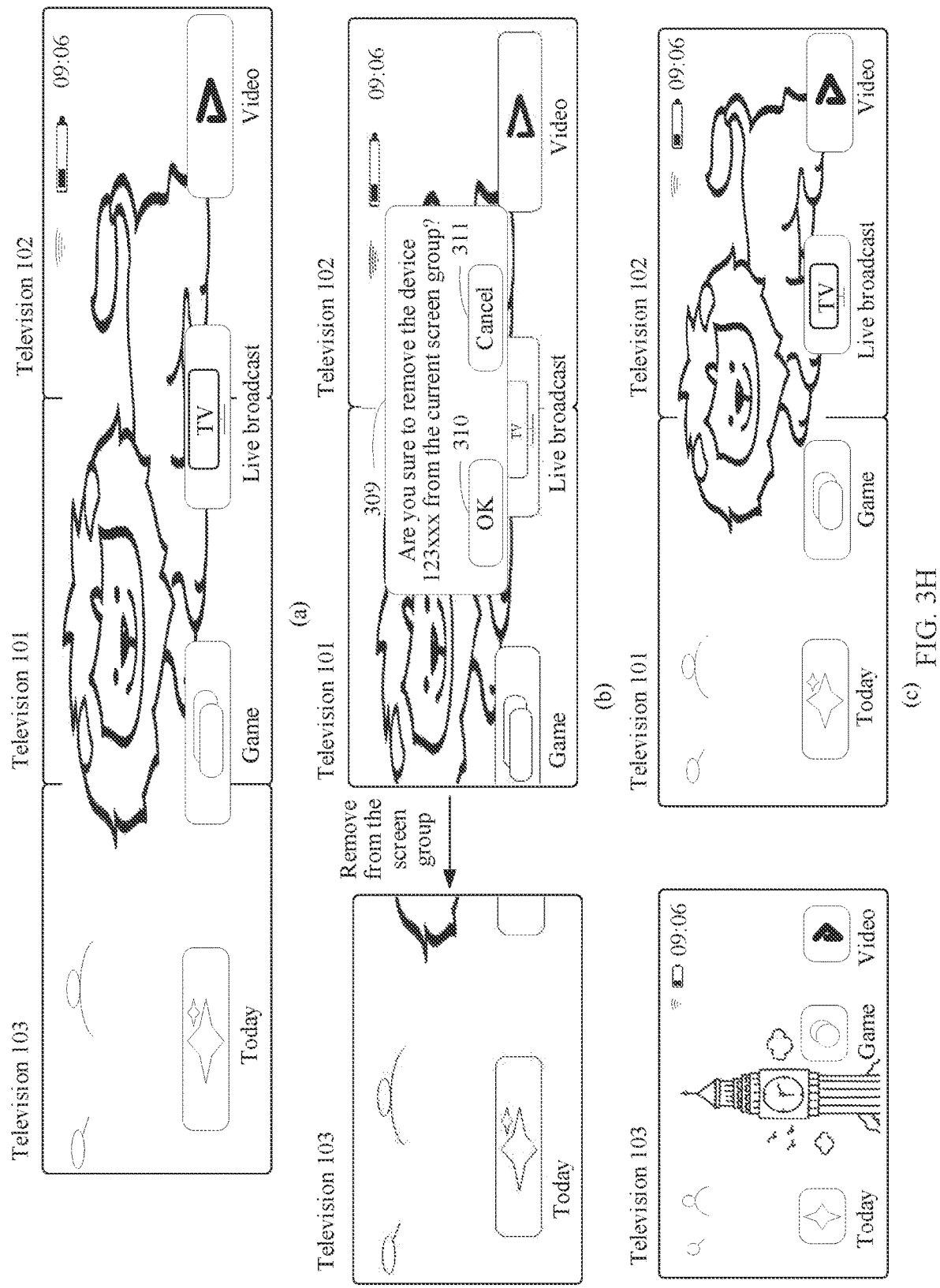
FIG. 3H is another schematic diagram of displaying according to an embodiment of this application.

In some other embodiments, as shown in (a) in FIG. 3H, a screen group including the television 101, the television 102, and the television 103 may jointly display corresponding display content. If the television 103 needs to be deleted from the screen group including the television 101, the television 102, and the television 103 (for example, the television 103 is removed after the television 101, the television 102, and the television 103 are spliced together), for example, as shown in (b) in FIG. 3H, the television 101, the television 102, and the television 103 may maintain previous display content of the television 101, the television 102, and the television 103, and the television 101 and the television 102 each may display a pop-up box 309, to prompt the user to determine whether to remove the device 123*xxx* from the current screen group. The pop-up box 309 may include an OK button 310 and a Cancel button 311. In response to an operation of clicking the OK button 310 by the user, as shown in (c) in FIG. 3H, the television 101 and the television 102 may jointly display corresponding display content (the display content of the television 101 and the display content of the television 102 may be determined by the processor of the television 101 (the master device)), and the television 103 independently displays corresponding display content (the display content of the television 103 may be determined by the processor of the television 103). In addition, if the user clicks the Cancel button 311, as shown in (b) in FIG. 3H, the television 101, the television 102, and the television 103 may maintain the previous display content.

Figure 4A:
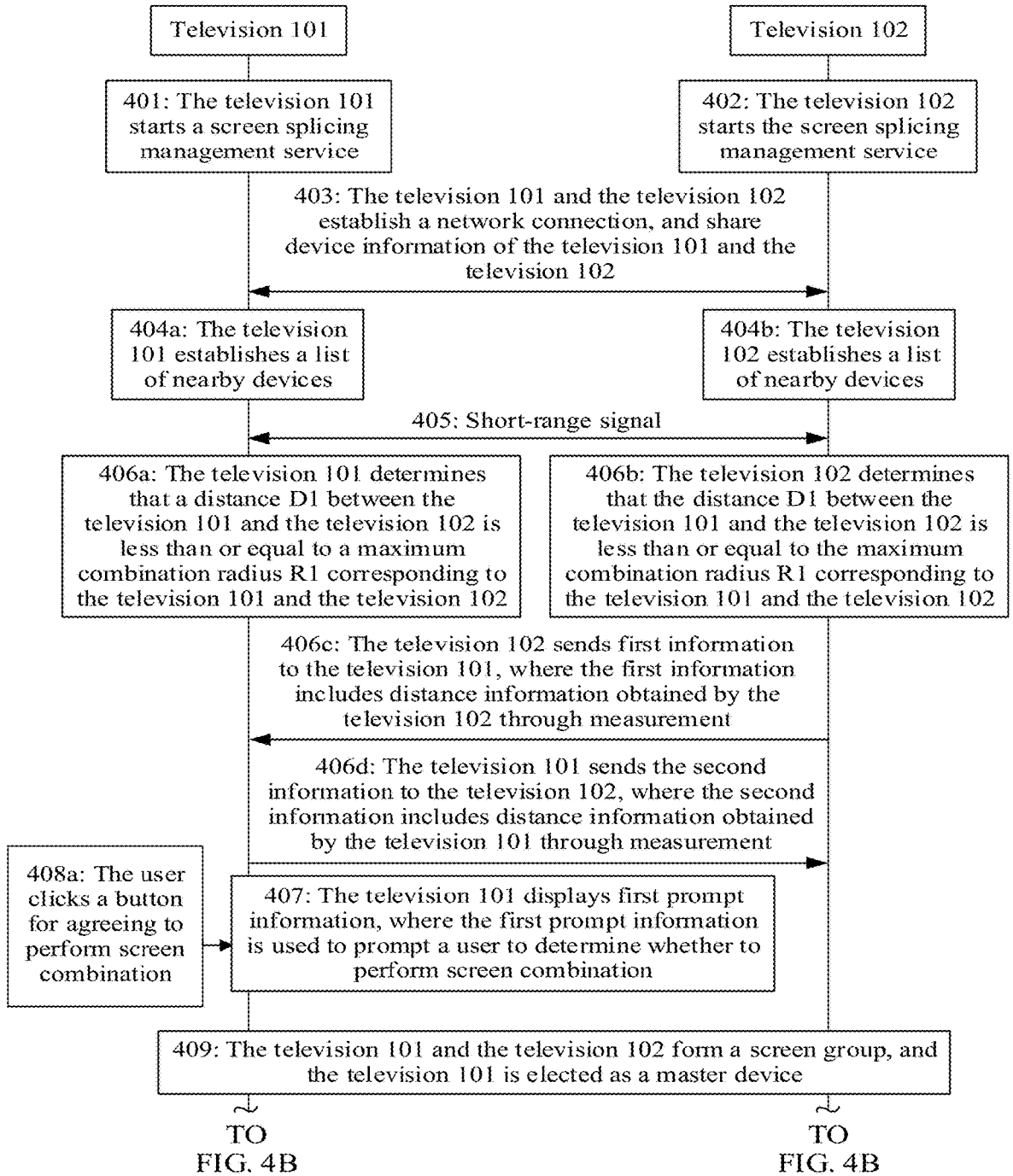
FIG. 4A and FIG. 4B are a schematic diagram of signal interaction according to an embodiment of this application.
Figure 4B:
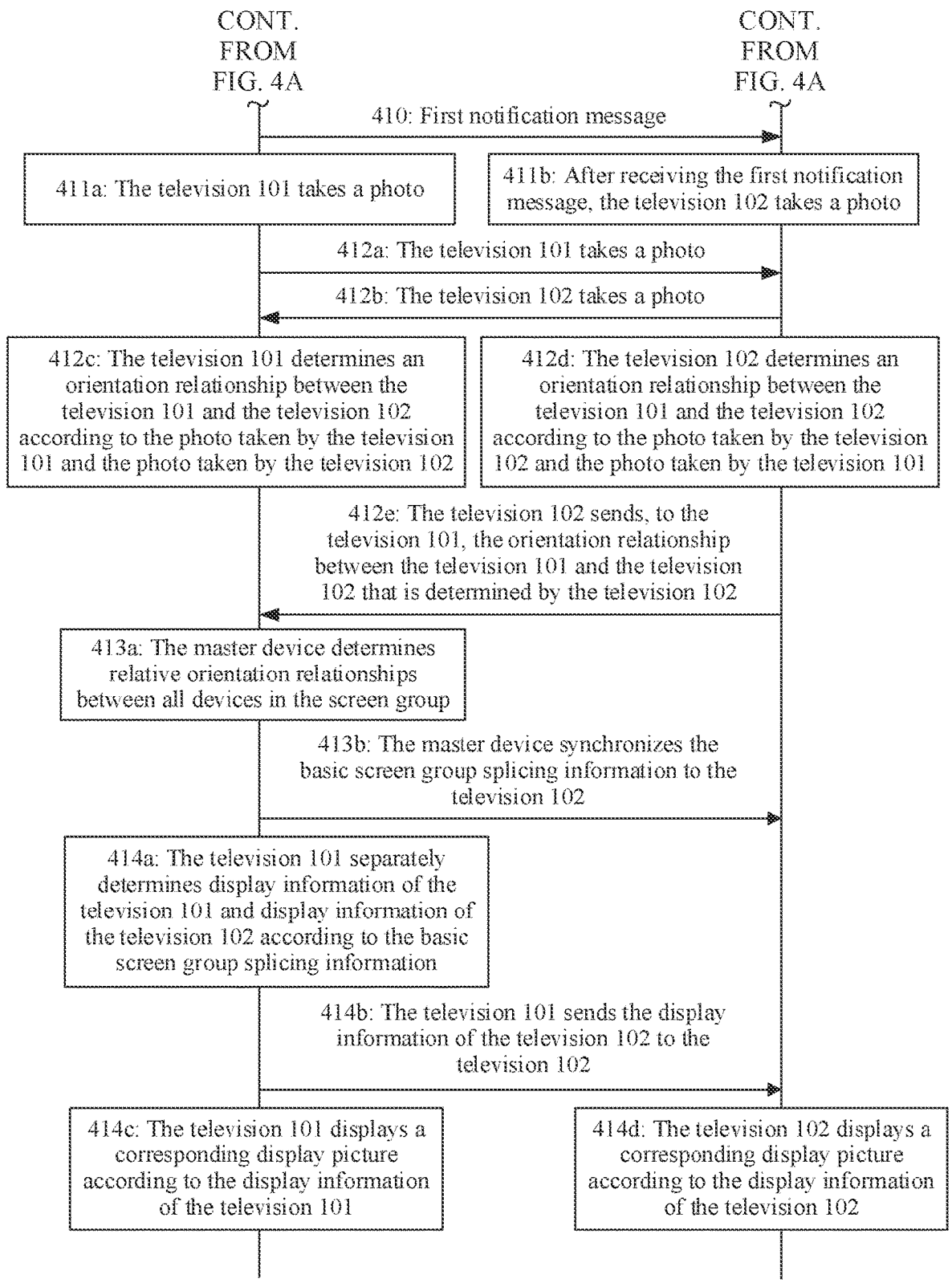

As shown in FIG. 4A and FIG. 4B, a specific implementation process of the screen combination method provided in this embodiment of this application is described by using an example in which screen splicing is performed on a television 101 and a television 102, including the following procedure.

401: The television 101 starts a screen splicing management service.

After the television 101 is powered on, the screen splicing management service may be started. Herein, the screen splicing management service may be integrated into a system app or a third-party app on the television 101, for example, an AI Life app, a smart interconnection app, or a settings app. This is not limited in this application.

402: The television 102 starts the screen splicing management service.

After the television 102 is powered on, the screen splicing management service may be started. For the screen splicing management service, refer to related descriptions of step 401. Details are not described herein again.

403: The television 101 and the television 102 establish a network connection, and share device information of the television 101 and the television 102.

In an implementation, the television 101 and the television 102 may access a same local area network, so as to establish a network connection between the television 101 and the television 102.

After the television 101 starts the screen splicing management service, the screen splicing management service of the television 101 may complete, based on a short-range communication technology (for example, a Bluetooth/Wi-Fi proximity discovery technology), discovery of another nearby device (for example, the television 102) on which the screen splicing management service is installed.

Similarly, after the television 102 starts the screen splicing management service, the screen splicing management service may discover another nearby screen device (for example, the television 101) based on a short-range communication technology (for example, a Bluetooth/Wi-Fi proximity discovery technology).

In some embodiments, the television 101 and the television 102 may directly discover and connect to each other by using a technology such as Bluetooth/Wi-Fi Direct.

404*a*: The television 101 establishes a list of nearby devices.

The screen splicing management service of the television 101 may exchange information with the screen splicing management service of another device (for example, the television 102) connected to the television 101, to obtain the list of nearby devices. For example, the list of nearby devices established by the television 101 may be shown in Table 1.

TABLE 1

| Nearby Device (connected) | MAC Address/ID |
|---|---|
| Television 102 | MAC2/ID2 |

Certainly, the television 101 may further be connected to more devices, for example, may be connected to devices such as the television 103 and the television 104. In this way, the list of nearby devices established by the television 101 may be shown in Table 2.

TABLE 2

| Nearby Device (connected) | MAC Address/ID |
|---|---|
| Television 102 | MAC2/ID2 |
| Television 103 | MAC3/ID3 |
| Television 104 | MAC4/ID4 |

Optionally, the television 101 may further obtain, from each device in the list of nearby devices, information about each device, such as a name, size information (for example, a length and a width of the device), and antenna information (an installation position of an antenna in the device, and a type, precision, and a size of the antenna).

404*b*: The television 102 establishes a list of nearby devices.

For example, the list of nearby devices established by the television 102 may be shown in Table 3.

TABLE 3

| Nearby Device (connected) | MAC Address/ID |
|---|---|
| Television 101 | MAC1/ID1 |

Certainly, the television 102 may further be connected to more devices, for example, may be connected to devices such as the television 103 and the television 104. In this way, the list of nearby devices established by the television 102 may be shown in Table 4.

TABLE 4

| Nearby Device (connected) | MAC Address/ID |
|---|---|
| Television 101 | MAC1/ID1 |
| Television 103 | MAC3/ID3 |
| Television 104 | MAC4/ID4 |

Optionally, the television 102 may further obtain, from each device in the list of nearby devices, information about each device, such as a name, size information (for example, a length and a width of the device), and antenna information (an installation position of an antenna in the device, and a type, precision, and a size of the antenna).

405: The television 101 and the television 102 send a short-range signal to each other.

In a possible design, the television 101 may separately measure a distance between the television 101 and each device in the list of nearby devices by using a short-range communication technology (for example, a Bluetooth/Wi-Fi signal ranging technology). For example, the television 101 may obtain a distance D1 between two devices based on a received signal strength indicator (received signal strength indicator, RSSI) of a short-range signal sent by the television 102.

The television 102 may measure a distance between the television 102 and each device in the list of nearby devices of the television 102. For example, the television 102 may obtain the distance D1 between the two devices based on an RSSI of a short-range signal sent by the television 101. Alternatively, the television 101 may inform the television 102 of the measured distance D1.

406a: The television 101 determines that a distance D1 between the television 101 and the television 102 is less than or equal to a maximum combination radius R1 corresponding to the television 101 and the television 102.

The television 101 may measure a distance between the television 101 and each device in the list of nearby devices, and determine a distance between every two devices (two devices) and a maximum combination radius corresponding to the every two devices.

For example, the television 101 may measure the distance D1 between the television 101 and the television 102 and determine a value of D1 and a maximum combination radius R1 between the television 101 and the television 102.

The maximum combination radius corresponding to the television 101 and the television 102 may be determined based on sizes of the two devices (the television 101 and the television 102) and positions of antennas. The antenna may be, for example, a Bluetooth antenna or a Wi-Fi antenna.

Figure 5:
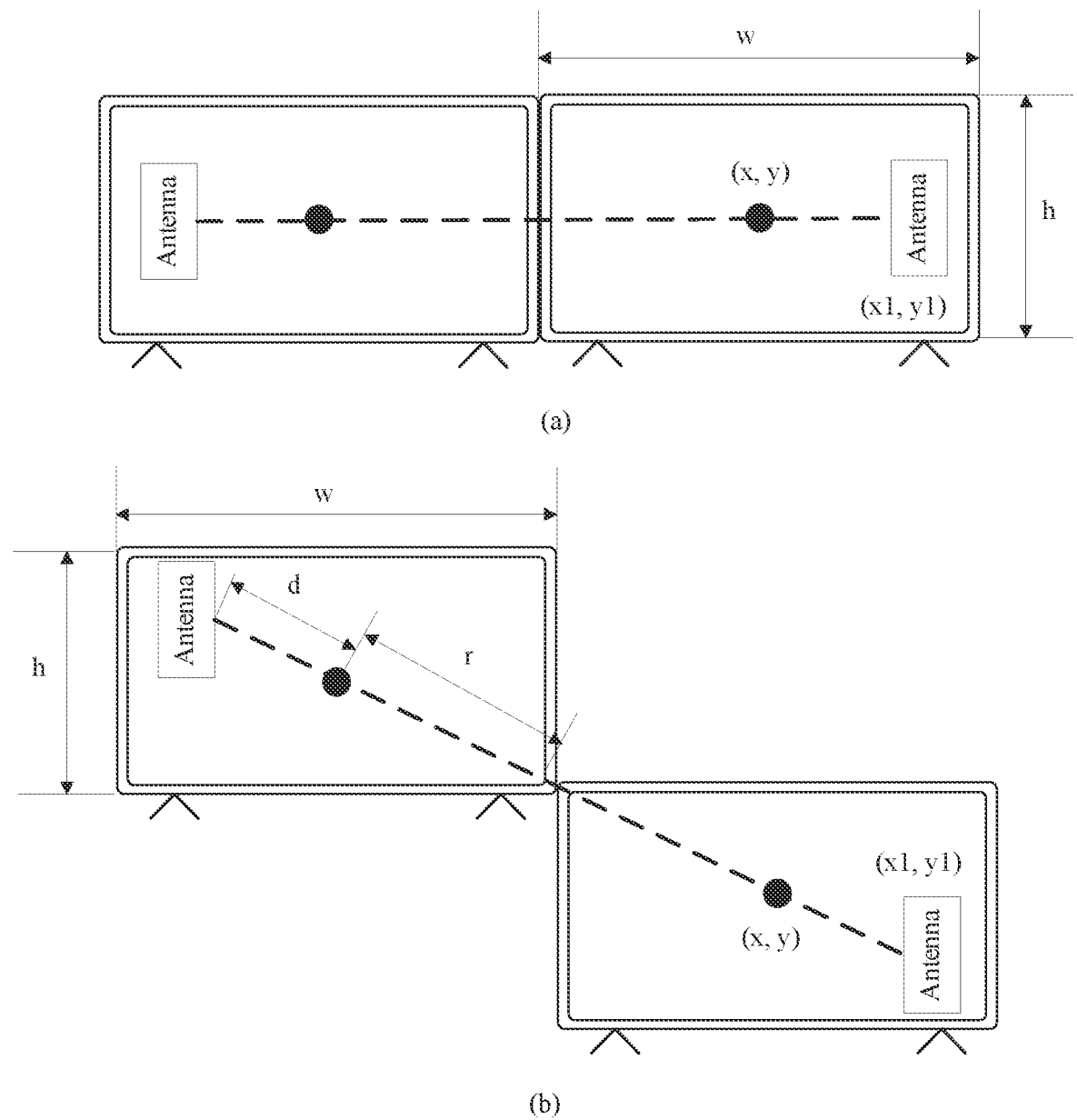
FIG. 5 is a schematic diagram of determining an antenna distance between two devices according to an embodiment of this application.

For example, as shown in (a) in FIG. 5, it is assumed that two devices (for example, a television 101 and a television 102) have a same size, a height of h, and a width of w, where w≥h; and an upper left corner of each device is considered as coordinates (0, 0) of a coordinate system, coordinates of a center point of each screen are (x, y), and coordinates of each antenna may be (x1, y1). Precision of an antenna distance identification may be a centimeters.

In a scenario in which two devices are combined left and right, assuming that the antenna is located in the middle of each device in a vertical direction, that is, y1=y and x1>x, a combination radius corresponding to the two devices is w+2*(x1−x)+2*a. Similarly, in a scenario in which two devices are combined from top to bottom, it is assumed that an antenna is located in the middle of a horizontal direction of each device, that is, x1=x, and y1>y, a combination radius corresponding to the two devices is h+2*(y1−y)+2*a.

As shown in (b) in FIG. 5, in a scenario in which two devices are diagonally combined, it is assumed that each of antennas is located at an edge of the corresponding device, for example, the antennas are respectively located in the upper left and the lower right. In this case, a combination radius corresponding to the two devices is 2*r+2*d+2*a, where d is a distance between the antenna and a center point of the device, and d=$\sqrt{(x1-x)^2+(y1-y)^2}$; and r is a maximum distance between the center point of each device and an edge, and $$r = \sqrt{\left(\frac{w}{2}\right)^2 + \left(\frac{h}{2}\right)^2}.$$

It may be understood that the combination radius corresponding to the two devices in the diagonal splicing scenario is the largest. To ensure that the combination radius is effective as much as possible, the maximum combination radius corresponding to the two devices may be R1=2*r+2*d+2*a. That is, the maximum combination radius corresponding to the two devices may be determined based on the distance between the television 101 and the television 102 in the diagonal splicing scenario.

The foregoing has described a method for calculating the maximum combination radius corresponding to two devices of the same size. If two devices of different sizes are combined, as shown in Table 5, assuming that size parameters corresponding to a device 1 are r1 and d1, and size parameters corresponding to a device 2 are r2 and d2, a maximum combination radius of the device 1 and the device 2 is R2=(r1+r2)+(d1+d2)+2*a. r1 is a maximum distance from a center point of the device 1 to an edge, and d1 is a distance between an antenna of the device 1 and the center point of the device 1; r2 is a maximum distance from a center point of the device 2 to an edge, and d2 is a distance between the antenna of the device 2 and the center point of the device 2; and precision of antenna distance identification is a centimeters.

TABLE 5

| Screen Size of the First Device | Screen Size of the Second Device | Maximum Combination Radius Between the First Device and the Second Device |
|---|---|---|
| r, d | r, d | R1 = 2*r + 2*d + 2*a |
| r1, d1 | r2, d2 | R2 = (r1 + r2) + (d1 + d2) + 2*a |

If the distance between the television 101 and the television 102 is less than or equal to the maximum combination radius corresponding to the television 101 and the television 102, it indicates that the two devices have an assembly intention (a combination intention) or are in an assembled state (a combined state).

The following uses an example in which the television 101 and the television 102 have a same size. When the television 101 determines that the distance between the television 101 and the television 102 is less than or equal to R1, the television 101 and the television 102 may be marked as a ready-to-combine state (a ready-to-splice state). That is, when the television 101 determines that the distance (placement interval) between the television 101 and the television 102 is less than or equal to the maximum combination radius R1 corresponding to the television 101 and the television 102, it is determined that the television 101 and the television 102 have a combination intention and may be prepared for combination. The television 101 may group and organize devices that are marked as a combination preparation state, to form a screen combination preparation device group, that is, the television 101 and the television 102 may form a screen combination preparation device group.

The television 101 may further measure a distance D2 between the television 101 and the television 103, and determine a value of D2 and a maximum combination radius R2 between the television 101 and the television 103. The television 101 may further measure a distance D3 between the television 101 and the television 104, and determine a value of D3 and a maximum combination radius R3 between the television 101 and the television 104. For a specific process, refer to the foregoing related descriptions. Details are not described herein again.

406b: The television 102 determines that the distance D1 between the television 101 and the television 102 is less than or equal to the maximum combination radius R1 corresponding to the television 101 and the television 102.

The television 102 may measure a distance between the television 102 and each device in the list of nearby devices, and determine a distance between every two devices and a maximum combination radius corresponding to the every two devices.

For a specific process, refer to related descriptions of step 406a. Details are not described herein again.

406c: The television 102 sends first information to the television 101, where the first information includes distance information obtained by the television 102 through measurement.

The television 101 may receive the first information from the television 102, where the first information may include a distance between the television 102 and each device in a list of nearby devices of the television 102, and/or a result that is determined by the television 102 and that is of a comparison between a distance between every two devices and a maximum combination radius corresponding to the every two devices.

Optionally, the television 101 may further receive, from another device, distance information and/or a comparison result obtained by the another device through measurement.

For another example, the television 101 may further receive the second information from the television 103. The second information may include a distance between the television 103 and each device in a list of nearby devices of the television 103, and/or a result that is determined by the television 103 and that is of a comparison between a distance between every two devices and a maximum combination radius corresponding to the every two devices.

For still another example, the television 101 may further receive third information from the television 104. The third information may include a distance between the television 104 and each device in the list of nearby devices of the television 104, and/or a result that is obtained by the television 104 and that is of a comparison between a distance between every two devices and a maximum combination radius corresponding to the every two devices.

In this way, the television 101 may determine a distance between every two devices (two devices) in a current local area network, and/or a result of a comparison between the distance between every two devices and the maximum combination radius corresponding to the two devices, so that the television 101 may determine a plurality of devices that currently need to be spliced together, and the plurality of devices that need to be spliced together may form a screen group.

It should be understood that a same local area network may include a plurality of screen combination preparation device groups (screen groups for short), each screen group may include at least two devices, the at least two devices may be spliced together, and the at least two devices may be directly or indirectly connected. For example, the television 101 and the television 102 may form a screen group, and the television 101 and the television 102 may be directly connected (the distance D1 between the television 101 and the television 102 is less than or equal to the maximum combination radius corresponding to the television 101 and the television 102).

406d: The television 101 sends the second information to the television 102, where the second information includes distance information obtained by the television 101 through measurement.

For a specific process, refer to step 406c. Details are not described herein again.

If the television 101 determines that the distance D1 between the television 101 and the television 102 is less than the maximum combination radius R1 corresponding to the television 101 and the television 102, that is, determines that the television 101 and the television 102 need to form a screen group, the television 101 may perform step 407.

407: The television 101 displays first prompt information, where the first prompt information is used to prompt the user to determine whether to perform screen combination.

The user may set a screen combination policy on the television 101 in advance, for example, may set automatic screen combination or manual screen combination.

If the user sets automatic screen combination, the television 101 may automatically start a screen combination/splicing detection program by using a short-range communication technology. The screen combination/splicing detection program detects whether a distance between every two devices is less than or equal to a maximum combination radius corresponding to the two devices, so as to determine whether screen combination/splicing needs to be performed. Optionally, the screen combination/splicing detection program may be automatically started in specific scenarios such as power-on and standby wake-up.

If the user sets manual screen combination, the user may access a screen splicing management service of an application, for example, an AI Life app, a smart interconnection app, or a setting application, and start a screen combination/splicing detection program manually (for example, by clicking a specific control). The television 101 may provide an interface prompt, and determine, according to an operation of the user, whether to perform screen combination. In this way, an error caused by automatic triggering of screen combination can be avoided.

For example, as shown in (a) in FIG. 3C, a home screen 300 of the television 101 is shown. When the television 101 determines that a distance D1 between the television 101 and the television 102 is less than or equal to a maximum combination radius R1 corresponding to the television 101 and the television 102, as shown in (b) in FIG. 3C, the television 101 may display a pop-up box 301 to inform the user that a nearby device is detected. The pop-up box 301 may include a Yes button 302 and a No button 303, so that the user can select whether to perform screen combination.

Optionally, the television 101 may also prompt the user with an identifier or an ID of a nearby device. For example, as shown in FIG. 3D, the television 101 may display a pop-up box 304 to inform the user that a nearby device 222xxx (222xxx is an ID of the television 102) is detected. The pop-up box 304 may include a Yes button 302 and a No button 303, so that the user can select whether to perform screen combination on a current device and a television in a living room.

Optionally, the television 102 may also display the first prompt information. When the television 101 and the television 102 each provide an interface prompt for the user to select whether to perform screen combination, if the user has confirmed on one device (for example, has confirmed on the television 101), the television 101 may send confirmation information of the user to the television 102, and the user does not need to confirm on the devices one by one.

In some embodiments, any device (for example, the television 101) in the screen group may provide an interface prompt (for example, display the first prompt information), so that the user can select whether to perform screen combination, that is, the television 102 may no longer provide an interface prompt.

408a: The user clicks a button for agreeing to perform screen combination.

For example, as shown in (c) in FIG. 3C, in response to the operation of clicking the Yes button 302 (for example, clicking the button 302 by using a remote control or a touchscreen) by the user, as shown in (d) in FIG. 3C, the user may be prompted that screen combination is being performed. In response to the operation of clicking, by the user, the button for agreeing to perform screen combination, step 409 may be performed. Alternatively, if the user sets automatic screen combination, in this case, step 409 may be directly performed without a need to prompt whether to perform screen combination on an interface (that is, neither step 407 nor step 408 needs to be performed).

409: The television 101 and the television 102 form a screen group, and the television 101 is elected as a master device.

The television 101 may perform weighted scoring on resources of the devices according to resource conditions of the devices in the current screen group, sequence the resources in descending order of resource scores, and use a device with a highest real-time resource score as the master device. The resource condition of the device may include hardware resource capabilities such as a central processing unit (central processing unit, CPU)/read-only memory (read only memory, ROM)/random access memory (random access memory. RAM). After the master device is determined, other devices in the screen group may be used as slave devices. For example, if the television 101 may be used as a master device, the television 102 may be used as a slave device.

Optionally, the user may manually select the master device. For example, the user may start a device setting application to select the master device. Alternatively, after the master device is automatically elected, the television 101 may display a pop-up box to prompt the user of an identifier of the current master device (for example, the user may be reminded that the current master device is a television in a living room (that is, the television 101)). The user may click an OK button in the pop-up box to confirm that the television 101 is used as a master device, or the user may click a modification button in the pop-up box to modify the master device. In this case, when the television 101 is used as the master device, it may be understood that the television 101 includes a host for controlling a screen group and a screen for displaying an image, and the host is integrated into the television 101.

The following uses an example in which the television 101 is a master device for description

410: The master device sends a first notification message to the television 102, where the first notification message is used to instruct the television 102 to take a photo and perform orientation identification.

For example, in a scenario in which the television 101 and the television 102 need to be combined, the master device (that is, the television 101) may take a photo by using a camera, and the television 101 may send the first notification message to the television 102, where the first notification message is used to instruct the television 102 to take a photo (image/picture) by using the camera, and instruct the television 102 to perform orientation identification according to the taken photo and a photo obtained from another device.

411a: The television 101 takes a photo.

The television 101 may control, by using the screen splicing management service, a camera of the television 101 to take a photo.

411b: After receiving the first notification message, the television 102 takes a photo.

The television 102 may control, by using the screen splicing management service, a camera of the television 102 to take a photo. The television 101 and the television 102 may negotiate to take photos at a same moment.

412a: The television 101 sends the photo taken by the television 101 to the television 102.

412b. The television 102 sends the photo taken by the television 102 to the television 101.

412c: The television 101 determines an orientation relationship between the television 101 and the television 102 according to the photo taken by the television 101 and the photo taken by the television 102.

After receiving, from the television 102, the photo taken by the television 102, the television 101 may perform, by using an image matching algorithm, image matching (comparison) on the photo taken by the television 101 and the photo taken by the television 102, to determine an overlapping area (that is, a similar image part/image content) between the two photos. Image matching is to determine an overlapping part of the two photos by analyzing correspondences between the two photos in terms of image content, feature, structure, relationship, texture, grayscale, and the like and analyzing similarity and consistency between the two photos.

For example, the image matching algorithm may include scale-invariant feature transform (scale invariant feature transform. SIFT), speeded up robust features (speeded up robust features, SURF), a fast nearest neighbor search algorithm (Flann-based matcher), and the like.

Then, the television 101 may determine a relative position relationship (a relative orientation relationship) between the television 101 and the television 102 based on a position of the overlapping area in the photo taken by the television 101. That is, the relative position relationship between the television 101 and the television 102 is determined based on a mapping relationship between a position of an overlapping area and a photographing orientation. The relative orientation relationship between the television 101 and the television 102 may be, for example, that the television 101 is located in a direction such as upper, lower, left, right, upper left, lower left, upper right, or lower right of the television 102. Alternatively, the relative orientation relationship between the television 101 and the television 102 may be that the television 102 is located in a direction such as upper, lower, left, right, upper left, lower left, upper right, or lower right of the television 101.

The splicing mode of the television 101 and the television 102 may include three modes: up-down splicing, left-right splicing, and diagonal splicing. For example, when the television 101 is located above or below the television 102, the splicing mode of the television 101 and the television 102 may be up-down splicing; or when the television 101 is located to the left or right of the television 102, the splicing mode of the television 101 and the television 102 may be left-right splicing; or when the television 101 is located in the upper left, lower left, upper right, or lower right of the television 102, the splicing mode of the television 101 and the television 102 may be diagonal splicing.

Figure 6:
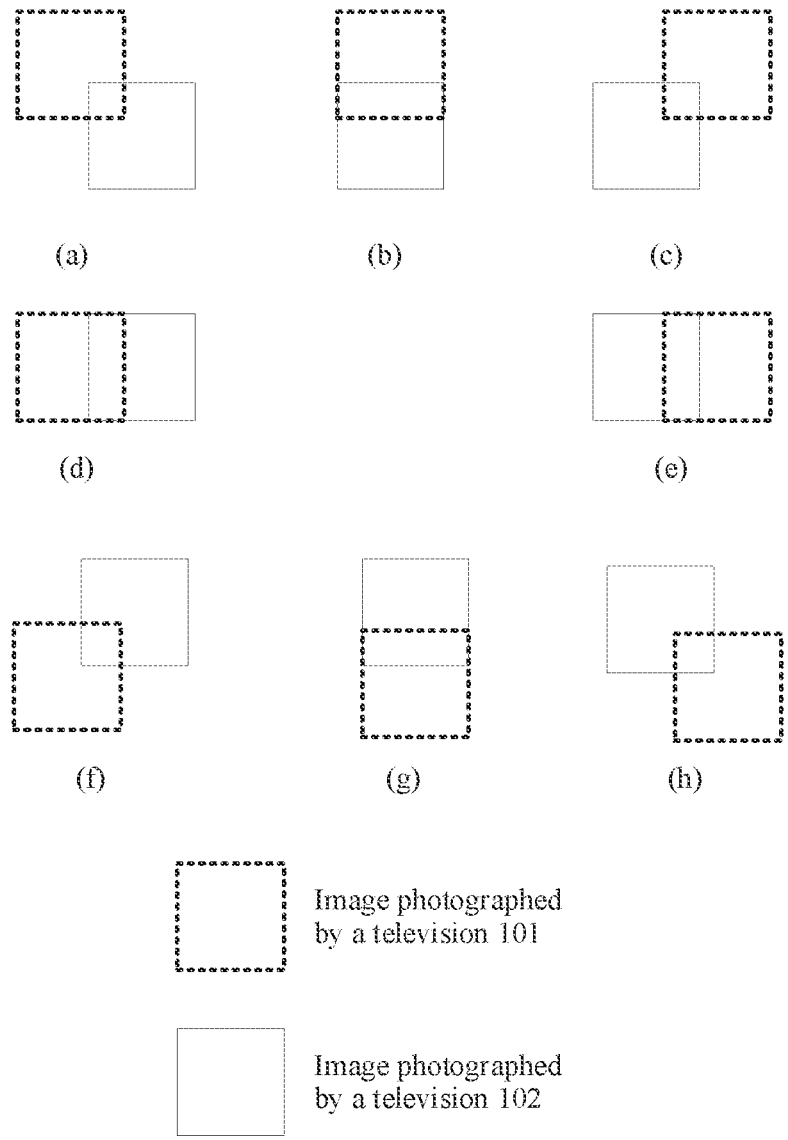
FIG. 6 is a schematic diagram of an overlapping area of images photographed by a television 101 and a television 102 according to an embodiment of this application.

For example, as shown in FIG. 6, a dashed box represents a photo taken by the screen television 101, and a solid box represents the photo taken by the screen television 102. In this case, an orientation of the screen television 101 relative to the screen television 102 is shown in Table 6.

corner) of the television 102. As shown in (d) in FIG. 6, if the overlapping area is located in the right half area of the photo taken by the television 101 and is located in the left half area of the photo taken by the television 102, it is determined that the television 101 is located to the left of the television 102. As shown in (e) in FIG. 6, if the overlapping area is located in the left half area of the photo taken by the television 101 and is located in the right half area of the photo taken by the television 102, it is determined that the television 101 is located to the right of the television 102. As shown in (f) in FIG. 6, if the overlapping area is located at an upper right corner of the photo taken by the television 101 and is located at a lower left corner of the photo taken by the television 102, it is determined that the television 101 is located to the lower left of the television 102. As shown in (g) in FIG. 6, if the overlapping area is located in the upper half area of the photo taken by the television 101 and is located in the lower half area of the photo taken by the television 102, it is determined that the television 101 is located below the television 102. As shown in (h) in FIG. 6, if the overlapping area is located at an upper left corner (lower left) of the photo taken by the television 101 and is located at lower right corner (lower right) of the photo taken by the television 102, it is determined that the television 101 is located to the lower right (at the lower right corner) of the television 102.

In a possible design, image matching may be performed on the photo taken by the television 101 and the photo taken

TABLE 6

| Splicing/ Combination Mode | Up-down | Diagonal | Left-right | Diagonal | Up-down | Diagonal | Left-right | Diagonal |
|---|---|---|---|---|---|---|---|---|
| Orientation of the television 101 relative to the television 102 | Upper | Upper right | Right | Lower right | Lower | Lower left | Left | Upper left |
| Position of the overlapping area in the photo taken by the television 101 | Lower half area | Lower left corner | Left half area | Upper left corner | Upper half area | Upper right corner | Right half area | Lower right area |
| Position of the overlapping area in the photo taken by the television 102 | Upper half area | Upper right corner | Right half area | Lower right corner | Lower half area | Lower left corner | Left half area | Upper left area |

For example, as shown in (a) in FIG. 6, if the overlapping area is located in a lower right area (lower right corner) of the photo taken by the television 101 and is located in an upper left area (upper left corner) of the photo taken by the television 102, it is determined that the television 101 is located to the upper left (at the upper left corner) of the television 102. As shown in (b) in FIG. 6, if the overlapping area is located in a lower half area of (right below) the photo taken by the television 101 and is located in an upper half area of (right above) the photo taken by the television 102, it is determined that the television 101 is located above (right above) the television 102. As shown in (c) in FIG. 6, if the overlapping area is located at the lower left corner (in the lower left) of the photo taken by the television 101 and is located at the upper right corner (in the upper right) of the photo taken by the television 102, it is determined that the television 101 is located to the upper right (at the upper right by the television 102, to identify an overlapping area between the two photos. Then, orientations of the overlapping area in the photo taken by the television 101 and the photo taken by the television 102 are separately calculated, and then a relative position relationship between the television 101 and the television 102 is detected by searching Table 6. For example, the overlapping area is in a lower half area of the photo taken by the television 101, and an orientation of the television 101 relative to the television 102 is upper, that is, the television 101 is located above the television 102.

In another possible design, a photo taken by each device (for example, the television 101 or the television 102) may be divided into several sub-areas (for example, 6, 9, or 12, which is not limited in this application); matching is performed between each sub-area in the photo taken by the television 101 and each sub-area in the photo taken by the television 102, to determine a number of each matched sub-area; orientations of each matched sub-area in the photo taken by the television 101 and the photo taken by the television 102 are determined according to the number of each matched sub-area; and then a relative position relationship between the television 101 and the television 102 is detected by searching Table 6.

Figure 7:
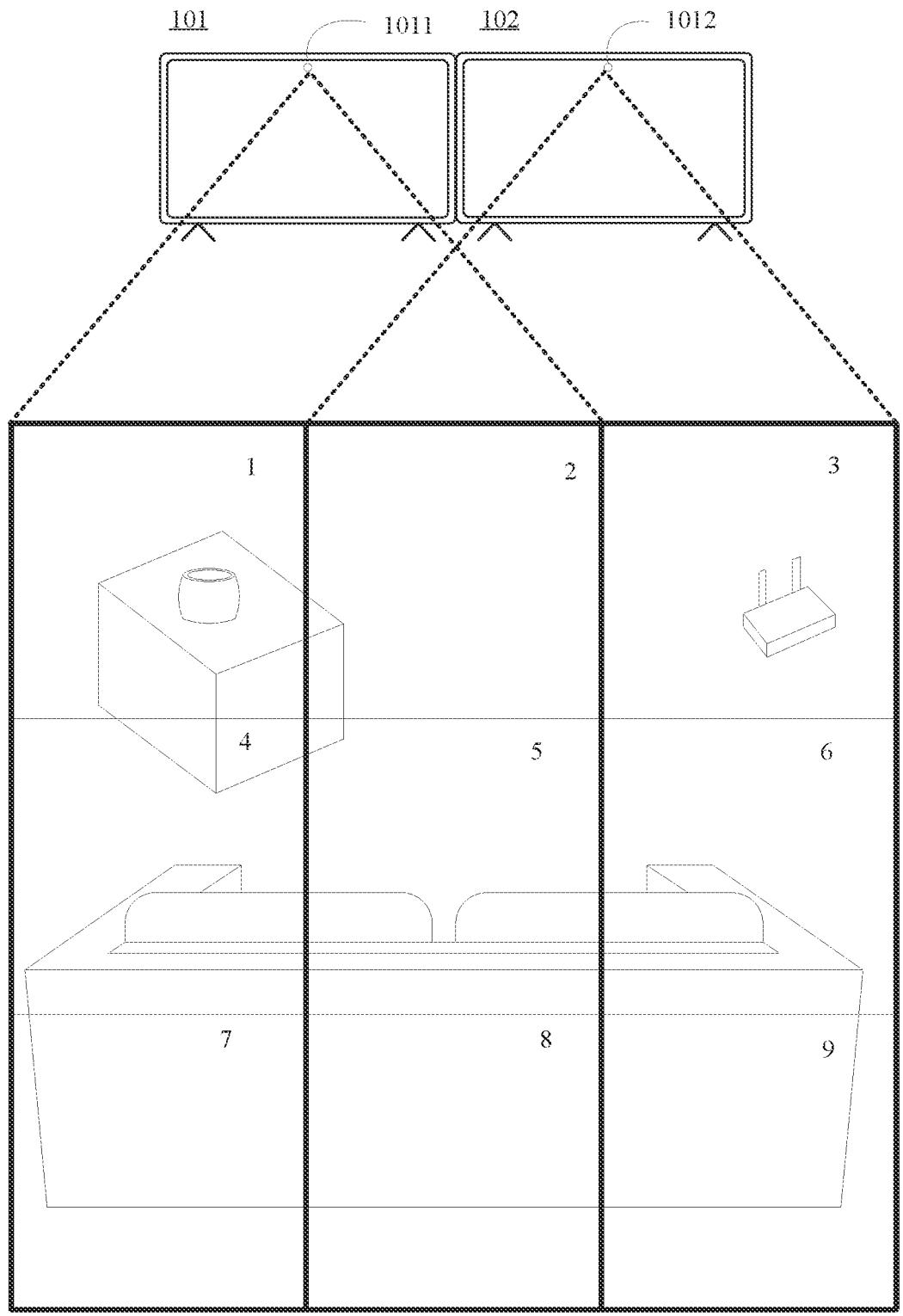
FIG. 7 is another schematic diagram of an overlapping area of images photographed by a television 101 and a television 102 according to an embodiment of this application.

For example, as shown in FIG. 7, it is assumed that the photo taken by the television 101 may be divided into six sub-areas: 1, 4, 7, 2, 5, and 8; and the photo taken by the television 102 may be divided into six sub-areas: 2, 5, 8, 3, 6, and 9. It can be learned that the matched sub-areas include 2, 5, and 8. Because 2, 5, and 8 are located in the right half area of the photo taken by the television 101, it can be learned, by searching Table 6, that the television 101 is located to the left of the television 102, that is, the television 102 is located to the right of the television 101. Alternatively, because 2, 5, and 8 are located in the left half area of the photo taken by the television 102, it can be learned, by searching Table 6, that the television 101 is located to the left of the television 102, that is, the television 102 is located to the right of the television 101.

In still another possible design, in a process of identifying a relative orientation relationship between devices whose screens are to be combined/spliced, a specific identification object, such as a face, a human body action, a specific object, or an appliance, may be added to a field of view of a camera of the device.

For example, after the screen combination assembly program starts, an operation prompt may be first displayed on the television 101 and/or the television 102, so that the user ensures that a specific identification object (for example, a face) can be seen in a picture of a camera of the television 101 and/or the television 102, and then a relative orientation relationship between the devices is determined according to a position of the face in a photo taken by the television 101 and/or a photo taken by the television 102.

Figure 8:
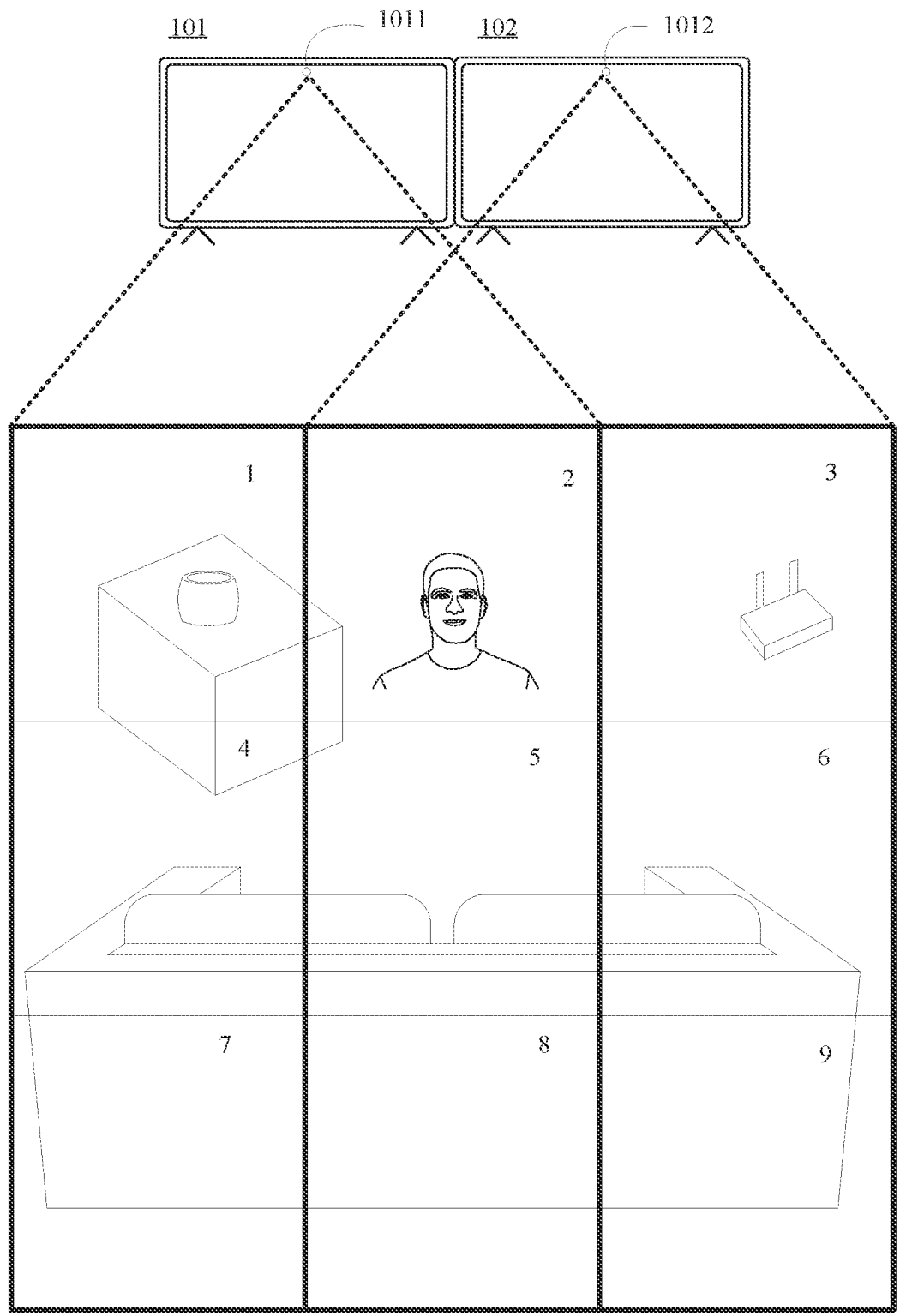
FIG. 8 is a schematic diagram of a position of a face in images photographed by a television 101 and a television 102 according to an embodiment of this application.

It should be noted that the position of the specific identification object in the photo taken by each device may have latitudes in a plurality of directions, for example, may include upper and lower latitudes and left and right latitudes. The latitudes in the same direction may be ignored, and the latitudes in different directions may be used as the basis for determining the orientation relationship between the devices. For example, as shown in FIG. 8, it is assumed that sub-areas of the photo taken by the television 101 include 1, 2, 4, 5, 7, and 8, sub-areas of the photo taken by the television 101 and sub-areas of the photo taken by the television 102 include 8 and 2, 3, 5, 6, 8, and 9, and a face is located in an area 2. Because the area 2 is located to the upper right of the photo taken by the television 101, and the area 2 is located to the upper left of the photo taken by the television 102, it may be determined, by searching Table 7, that the television 101 is located to the left of the television 102. That is, the latitudes in the same direction are ignored (that is, the latitudes in the "upper" direction in the upper right and upper left are ignored), and the latitudes in the left and right directions are used as the basis for determining the orientation relationship between the devices.

TABLE 7

| Splicing/Combination Mode | Left-right | | | Left-right | | |
|---|---|---|---|---|---|---|
| Orientation of the television 101 relative to the television 102 | Right | | | Left | | |
| Position of the specific identification object in a photo taken by the television 101 | Left half area | Lower left corner | Upper left corner | Right half area | Lower right corner | Upper right corner |
| Position of the specific identification object in a photo taken by the television 102 | Right half area | Lower right corner | Upper right corner | Left half area | Lower left corner | Upper left corner |

Optionally, a related program may be preset in the screen splicing management service, to prompt the user to provide a cooperation measure through screen display, sound prompt, or the like, so as to accelerate identification of a specific position by the camera, thereby accelerating identification of a relative position of a picture. Alternatively, a specific image input is provided to a camera of a device to mark an orientation of the corresponding device.

412*d*: Optionally, the television 102 determines an orientation relationship between the television 101 and the television 102 according to a photo taken by the television 102 and a photo taken by the television 101.

For a specific process, refer to the description in step 412*a*. Content such as an execution body may be simply replaced, and details are not described herein again.

412*e*: The television 102 sends, to the television 101, the orientation relationship between the television 101 and the television 102 that is determined by the television 102.

413*a*: The master device determines relative orientation relationships between all devices in the screen group.

The master device may collect and summarize information about the relative orientation relationship between every two devices in the screen group, perform unified orchestration in a coordinate system according to the orientation information, and record information such as a number and coordinates for each device.

Orientations of all devices in the screen group may be represented by using an array, for example, may be (a device 1, a device 2, a direction of the device 1 relative to the device 2). For example, it is assumed that the screen group includes only the television 101 and the television 102, and an orientation of the television 101 relative to the television 102 may be (the television 101, the television 102, above), indicating that the television 101 is located above the television 102. Alternatively, an orientation of the television 102 relative to the television 101 may be (the television 102, the television 101, down), indicating that the television 102 is located below the television 101.

Figure 9:
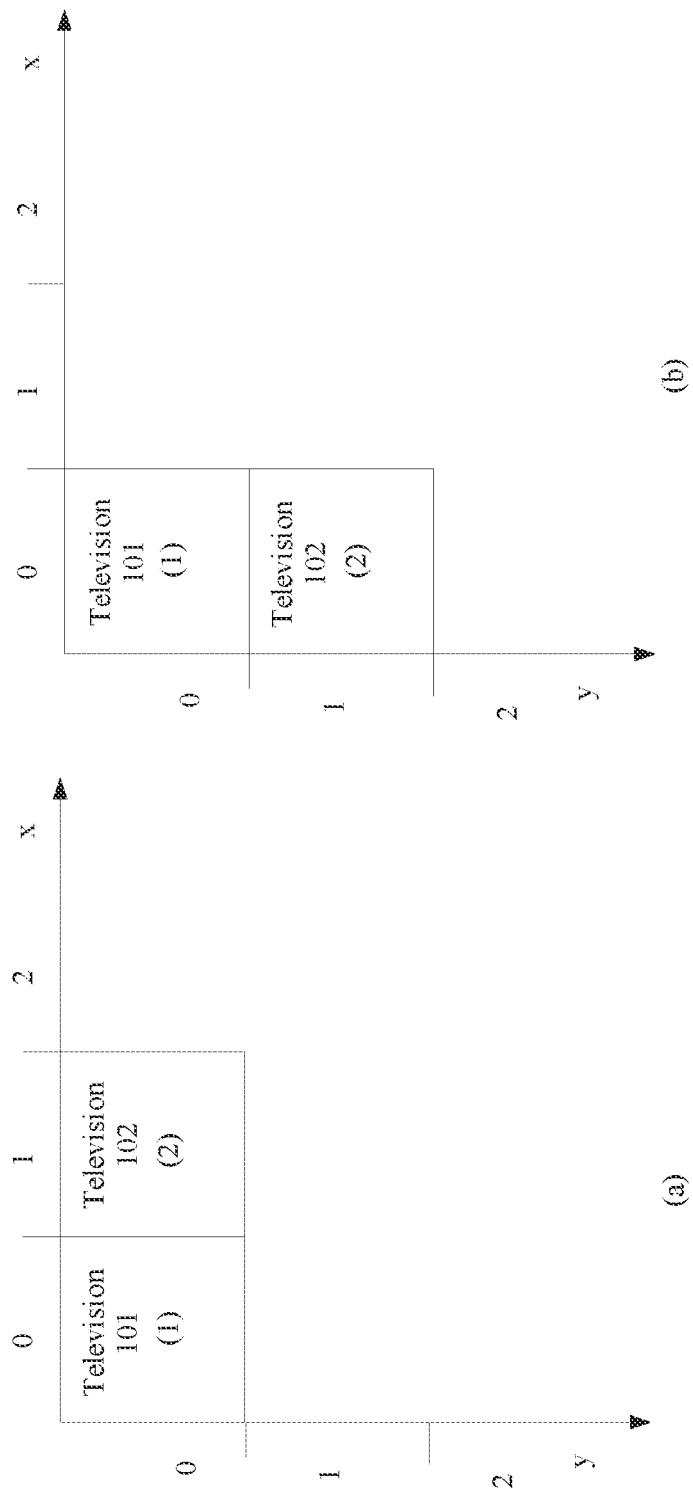
FIG. 9 is a schematic diagram of sequencing devices according to an embodiment of this application.

As shown in (a) in FIG. 9, if the master device determines that the orientation of the television 101 relative to the television 102 is (the television 101, the television 102, left), that is, the television 101 is located to the left of the television 102, the television 101 and the television 102 may be arranged in the coordinate system from left to right, and the television 101 and the television 102 may be arranged as "(1), (2)", that is, the television 101 and the television 102 are respectively arranged from left to right.

As shown in (b) in FIG. 9, if the master device determines that an orientation of the television 101 relative to the television 102 is (the television 101, the television 102, up), that is, the television 101 is located above the television 102, the television 101 and the television 102 may be arranged in a downlink direction in the coordinate system, and the television 101 and the television 102 may be arranged as "(1), (2)", that is, the television 101 and the television 102 are respectively arranged from top to bottom.

In a possible design, the master device may number the devices in a screen group one by one in a direction from upper left to lower right. For example, the devices spliced together may be arranged into an n*m matrix, where n may represent a row, m may represent a column, n is an integer greater than or equal to 1, m is an integer greater than or equal to 1, and n and m are not both 1. For example, as shown in (a) in FIG. 9, it is assumed that n=1 and m=2. During encoding, encoding may start from the top device in the first column. After encoding of the devices in the first column is completed, encoding may start from the top device in the second column until encoding of the devices in the second column is completed. In this way, encoding of n*m devices may be completed. For another example, as shown in (b) in FIG. 9, it is assumed that n=2 and m=1. During encoding, encoding may start from the leftmost device in the first row. After encoding of the devices in the first row is completed, encoding may start from the leftmost device in the second row until encoding of the devices in the second row is completed. In this way, encoding of n*m devices may be completed.

413*b*: The master device synchronizes basic screen group splicing information to the television 102.

The master device may synchronize the basic screen group splicing information to all devices in the screen group. Each device in the screen group may receive a synchronization message sent by the master device. The synchronization message includes the basic screen group splicing information. The basic screen group splicing information includes a quantity of devices included in the screen group, a MAC address/an ID of each device, master-slave information (that is, information about the master device and the slave device), information about an orientation relationship between devices, and the like. For example, the current basic screen group splicing information may include the quantity (for example, 2) of the devices included in the screen group, the MAC address/ID of each device (for example, IDs of the television 101 and the television 102), the master-slave information (for example, the master device is the television 101, and the slave device is the television 102), and the information about the orientation relationship between devices (for example, the television 101 and the television 102 are in a left-right splicing state).

After each device in the screen group receives the synchronization message sent by the master device, a heartbeat link may be established between every two devices, so as to maintain a combination relationship between the devices in real time. For example, it is assumed that the heartbeat link is established between the television 101 and the television 102. If the television 101 may send a heartbeat monitoring data frame (which may also be referred to as a heartbeat packet) to the television 102 at an interval of one minute (or 30 s, 2 minutes, 3 minutes, or the like), and the television 102 may send a response frame after receiving the heartbeat monitoring data frame, the television 101 determines that the connection is normal, otherwise, it indicates that the connection is disconnected or abnormal.

414*a*: The television 101 separately determines display information of the television 101 and display information of the television 102 according to the basic screen group splicing information.

The television 101 may separately determine the display information of the television 101 and the display information of the television 102 according to the basic screen group splicing information. That is, in a running process of a screen group system, the master device may implement, based on the basic screen group splicing information, picture output display arrangement of the screen group, interface focus switching, and the like.

414*b*: The television 101 sends the display information of the television 102 to the television 102.

414*c*: The television 101 displays a corresponding display picture according to the display information of the television 101.

414*d*: The television 102 displays a corresponding display picture according to the display information of the television 102.

For example, the television 101 may divide the display content of the television 101 into N parts (for example, two parts), and then allocate the N parts to each device (for example, the television 101 itself and the television 102) in the screen group, where N is less than or equal to a quantity of devices included in the screen group.

For example, it is assumed that display content of the television 101 and display content of the television 102 before splicing are respectively shown in (a) and (b) in FIG. 3E. After splicing, as shown in (c) in FIG. 3E, the television 101 and the television 102 may jointly display a desktop of the master device (for example, the television 101); or as shown in (d) in FIG. 3E, the television 101 and the television 102 may separately display a desktop of the master device (for example, the television 101).

It should be noted that, in a process of using the screen combination, each device in the screen group may continuously detect an increase or decrease of a device, and update basic screen group splicing information. Adding devices may mean that new devices are added to the current screen group. Reducing devices may mean that some devices are actively disassembled or removed from the current screen group, or some devices passively get offline due to power-off. The television 101 may detect, through short-range communication, whether a new device is added. The television 101 may detect, according to the heartbeat link, whether the peer device is offline. Alternatively, the television 101 may determine, through short-range communication detection, whether a device is offline. Alternatively, the user may manually remove a device on a management interface.

Figure 10A:
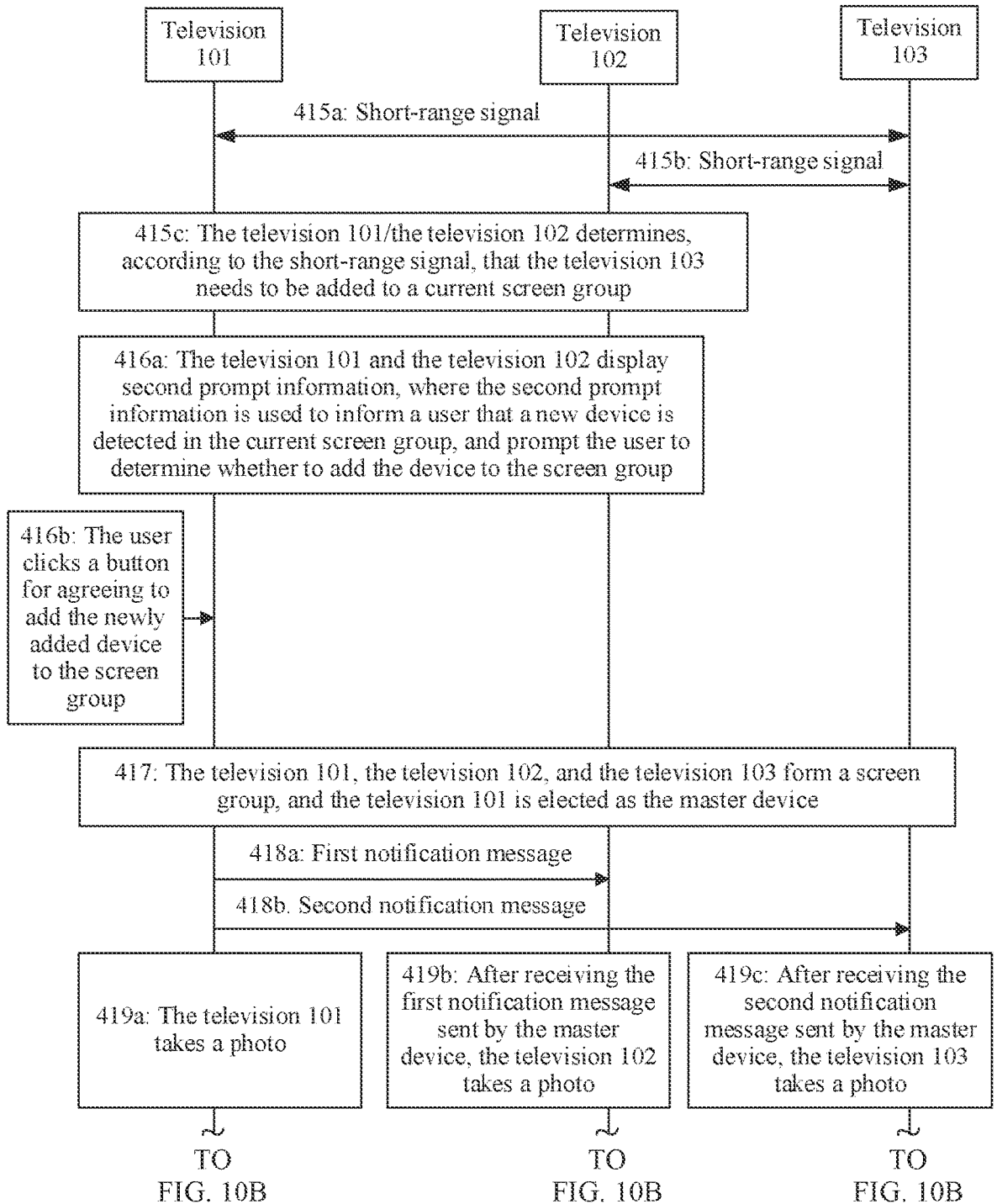
FIG. 10A to FIG. 10C are another schematic diagram of signal interaction according to an embodiment of this application.
Figure 10B:
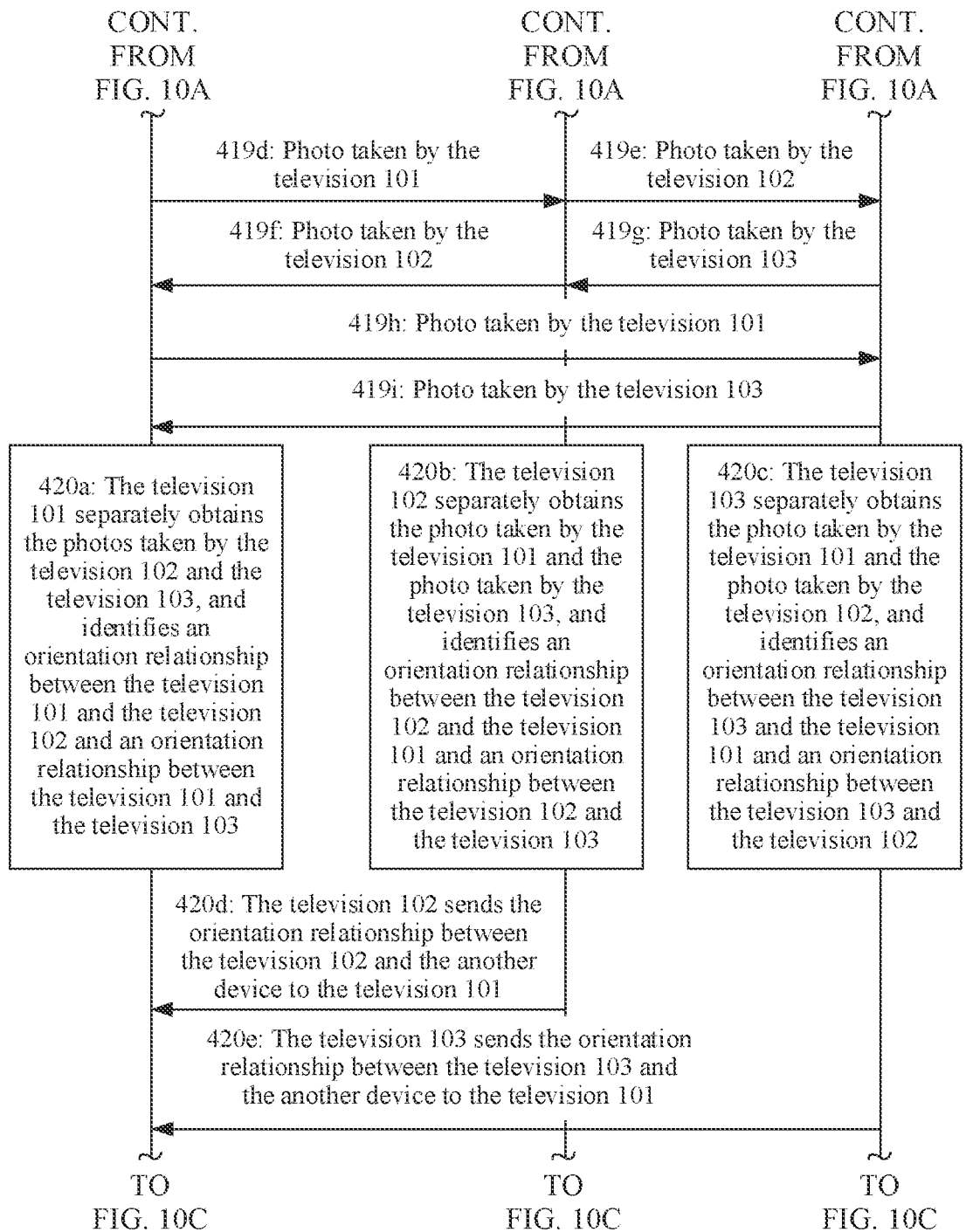
Figure 10C:
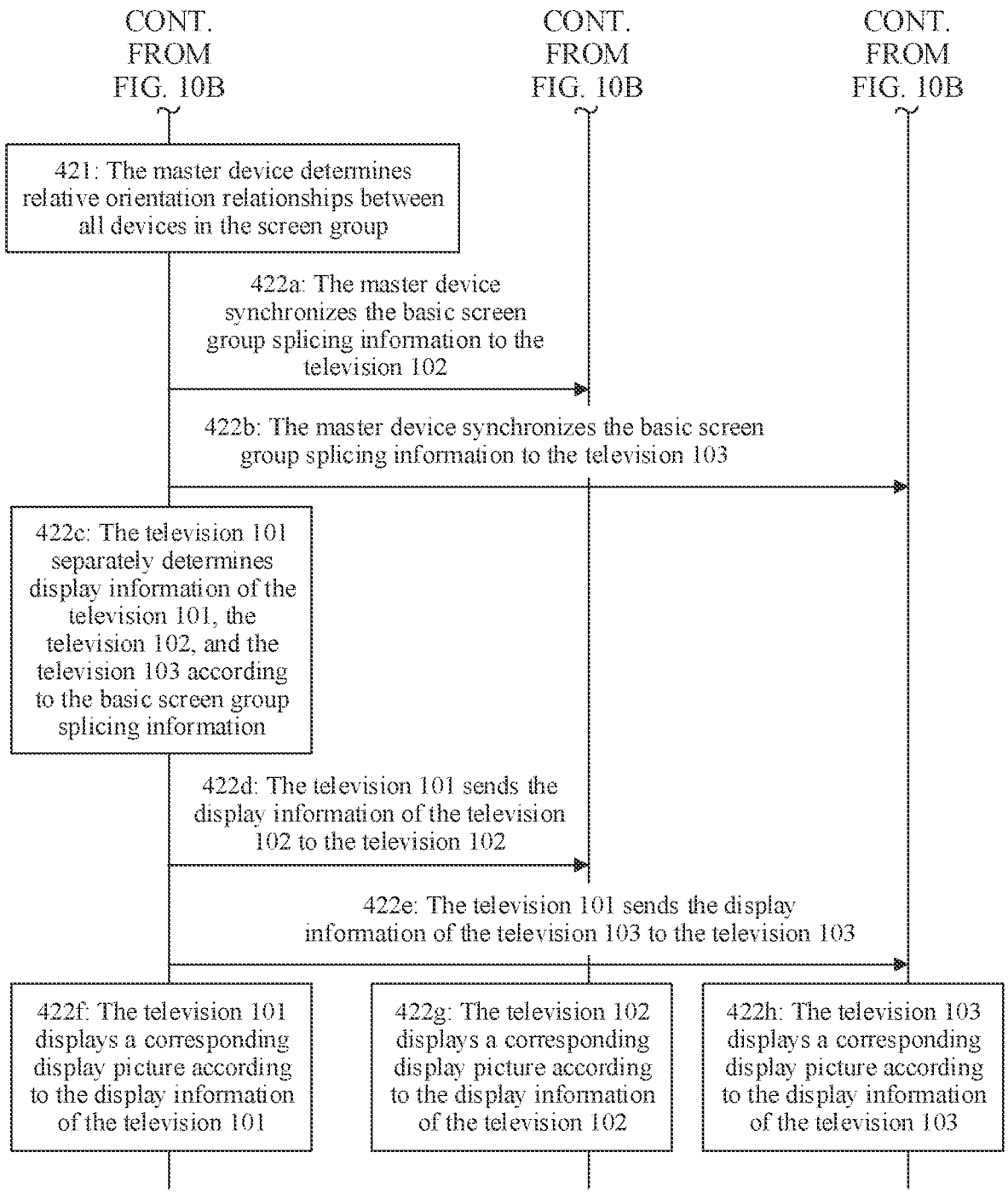

In some embodiments, if a television 103 is newly added to a screen group including the television 101 and the television 102, as shown in FIG. 10A to FIG. 10C, the screen group splicing method may further include the following steps.

415*a*: Send a short-range signal between the television 101 and the television 102.

The short-range signal may be periodically sent between the television 101 and the television 102.

415*b*: Send a short-range signal between the television 102 and the television 103.

The short-range signal may be periodically sent between the television 102 and the television 103.

415c: The television 101/the television 102 determines, according to the short-range signal, that the television 103 needs to be added to the current screen group.

The television 101 may measure a distance between the television 101 and the television 103 according to the short-range signal, and the television 102 may measure a distance between the television 102 and the television 103 according to the short-range signal.

If one of the following conditions is met, it may be considered that the television 103 needs to be added to the current screen group. (1) The distance D2 between the television 101 and the television 103 is less than or equal to a corresponding maximum combination radius R2 between the television 101 and the television 103, that is, D2≤R2; and (2) The distance D4 between the television 102 and the television 103 is less than or equal to the corresponding maximum combination radius R4 between the television 102 and the television 103, that is, D4≤R4.

The television 101 compares the distance D2 between the television 101 and the television 103 and the corresponding maximum combination radius R2 between the television 101 and the television 103. Optionally, the television 101 may further obtain, from the television 102, information about the distance D4 between the television 102 and the television 103 and information about the corresponding maximum combination radius R4 between the television 102 and the television 103.

If the television 101 determines that the distance D2 between the television 101 and the television 103 is less than or equal to the maximum combination radius R2 between the television 101 and the television 103, that is, D2≤R2, the television 101 determines that the television 101, the television 102, and the television 103 may form a screen group. For a process of determining the maximum combination radius R2 between the television 101 and the television 103, refer to related descriptions of step 406a. Details are not described herein again.

The television 102 may compare the distance D4 between the television 102 and the television 103 and the corresponding maximum combination radius R4 between the television 102 and the television 103. If D4>R4, the television 102 may further obtain, from the television 101, information that D2 is less than or equal to R2, to determine that the television 103 needs to be added to the current screen group.

For example, in a scenario in which three devices such as the television 101, the television 102, and the television 103 are combined, the television 101 and the television 102 may be within a corresponding maximum combination radius (that is, the maximum combination radius corresponding to the television 101 and the television 102); the television 101 and the television 103 may be within a corresponding maximum combination radius (that is, the maximum combination radius corresponding to the television 101 and the television 103); and the television 102 and the television 103 may not be within a corresponding maximum combination radius (that is, the maximum combination radius corresponding to the television 102 and the television 103). That is, the television 103 may be indirectly spliced with the television 102 (the distance D2 between the television 103 and the television 102 is greater than the maximum combination radius corresponding to the television 103 and the television 102); and the television 103 may be directly spliced with the television 101 (the distance D3 between the television 103 and the television 101 is less than or equal to the maximum combination radius corresponding to the television 103 and the television 101). Because the television 101 and the television 102 are spliced together, and the television 101 and the television 103 are spliced together, the television 101, the television 102, and the television 103 are spliced together.

Every two of the television 101, the television 102, and the television 103 may perform orientation identification (that is, identify a splicing mode of every two devices). For example, the television 101 and the television 102 may perform orientation identification according to a photographed photo (that is, identify whether the television 101 and the television 102 may be spliced vertically, horizontally, or diagonally); the television 101 and the television 103 may perform orientation identification according to the photographed photo; and the television 102 and the television 103 may perform orientation identification according to the photographed photo.

It should be noted that, if the television 103 is a device that has joined the local area network, the television 101/the television 102 may directly perform step 416a. If the television 103 is a device newly added to the local area network, the television 101 and the television 102 may establish a connection to the television 103 based on the local area network and discover each other based on a short-range communication technology; or the television 101 and the television 102 may establish a direct connection to the television 103; the television 101 and the television 102 may update a list of nearby devices, and the television 103 may create a list of nearby devices; and then the television 101/the television 102 may perform step 416a.

416a: The television 101 and the television 102 display second prompt information, where the second prompt information is used to inform the user that a new device is detected in the current screen group.

For example, as shown in (b) in FIG. 3F, the television 101 and the television 102 each may display a pop-up box 305 to inform the user that a device 123xxx (123xxx is an ID of the television 103) is detected. The pop-up box 305 may include a Yes button 302 and a No button 303, so that the user can select whether to add the device to the screen group. Optionally, the television 103 may also prompt the user with an identifier or an ID of a nearby device. For example, the television 103 may display a pop-up box 306 to inform the user that a device 111xxx (111xxx may be an ID of the television 101) is detected. The pop-up box 306 may include a Yes button 302 and a No button 303, so that the user can select whether to perform screen combination on the current device and the television 103.

416b: The user clicks a button for agreeing to add the newly added device to the screen group.

In response to the operation of clicking, by the user, the button for agreeing to add the newly added device to the screen group, step 417 may be performed.

417: The television 101, the television 102, and the television 103 form a screen group, and the television 101 is elected as the master device.

For a process of electing the master device, refer to the descriptions in step 409. Details are not described herein again. In this case, when the television 101 is used as the master device, it may be understood that the television 101 includes a host for controlling a screen group and a screen for displaying an image, and the host is integrated into the television 101.

The following uses the television 101 as the master device for description.

418a: The television 101 sends a first notification message to the television 102.

The first notification message is used to instruct the television 102 to take a photo and perform orientation identification according to the photo taken by the television 102 and a photo obtained from another device.

418*b*: The television 101 sends a second notification message to the television 103.

The second notification message is used to instruct the television 103 to take a photo and perform orientation identification according to the photo taken by the television 103 and a photo obtained from another device.

419*a*: The television 101 takes a photo.

The television 101 may control, by using the screen splicing management service, a camera of the television 101 to take a photo.

419*b*: After receiving the first notification message sent by the master device, the television 102 takes a photo.

The television 102 may control, by using the screen splicing management service, a camera of the television 102 to take a photo. The television 101 and the television 102 may negotiate to take photos at a same moment.

419*c*: After receiving the second notification message sent by the master device, the television 103 takes a photo.

The television 103 may control, by using the screen splicing management service, a camera of the television 103 to take a photo. The television 101 and the television 103 may negotiate to take photos at a same moment.

It may be understood that the television 101, the television 102, and the television 103 may negotiate to take photos at a same moment.

The photos taken by the television 101, the television 102, and the television 103 may be shared, that is, steps 419*d* to 419*i* may be performed.

419*d*: The television 101 sends the photo taken by the television 101 to the television 102.

419*e*: The television 102 sends the photo taken by the television 102 to the television 103.

419*f*: The television 102 sends the photo taken by the television 102 to the television 101.

419*g*: The television 103 sends the photo taken by the television 103 to the television 102.

419*h*: The television 101 sends the photo taken by the television 101 to the television 103.

419*i*: The television 103 sends the photo taken by the television 103 to the television 101.

420*a*: The television 101 separately obtains the photos taken by the television 102 and the television 103, and identifies an orientation relationship between the television 101 and the television 102 and an orientation relationship between the television 101 and the television 103.

For a corresponding orientation identification process, refer to related descriptions of step 412*a*. Details are not described herein again.

420*b*: The television 102 separately obtains the photo taken by the television 101 and the photo taken by the television 103, and identifies an orientation relationship between the television 102 and the television 101 and an orientation relationship between the television 102 and the television 103.

For a corresponding orientation identification process, refer to related descriptions of step 412*a*. Details are not described herein again.

420*c*: The television 103 separately obtains the photo taken by the television 101 and the photo taken by the television 102, and identifies an orientation relationship between the television 103 and the television 101 and an orientation relationship between the television 103 and the television 102.

For a corresponding orientation identification process, refer to related descriptions of step 412*a*. Details are not described herein again.

420*d*: The television 102 sends the orientation relationship between the television 102 and the another device to the television 101.

420*e*: The television 103 sends the orientation relationship between the television 103 and the another device to the television 101.

421: The master device determines relative orientation relationships between all devices in the screen group.

For example, the relative orientation relationship between the television 101 and the television 102 may be, for example, that the television 101 is located in a direction such as upper, lower, left, right, upper left, lower left, upper right, or lower right of the television 102.

If the screen group includes more than two devices, the relative orientations between the devices are identified. Every two devices located within a maximum combination radius (that is, a distance between two devices is less than or equal to a maximum combination radius corresponding to the two devices) may be considered as a screen group with a same radius, and an orientation of each device relative to another device may be identified by identifying a relative orientation of each screen group with a same radius.

For example, it is assumed that the screen group includes three devices: a television 101, a television 102, and a television 103. A relative orientation relationship between every two devices can be identified, so that orientations of each device relative to other devices can be identified.

Figure 11A:
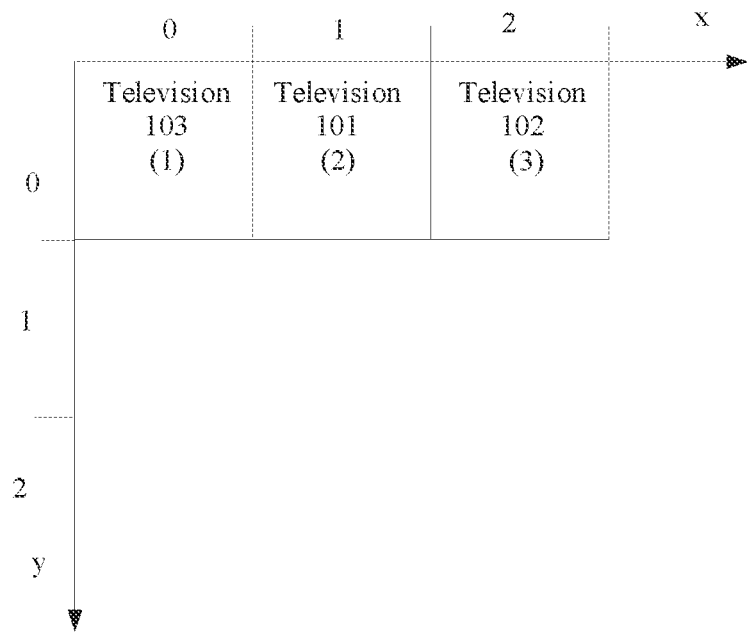
FIG. 11A is another schematic diagram of sequencing devices according to an embodiment of this application.

As shown in FIG. 11A, for example, three devices, namely the television 101, the television 102, and the television 103, are horizontally arranged. It is assumed that a sequence of identifying every two devices from left to right is as follows: the television 103 and the television 101, and the television 101 and the television 102. A sequencing process of determining the three devices may be as follows: It is determined that the television 103 is located on the leftmost side of the other two devices (the television 101 and the television 102) by traversing an orientation relationship between every two devices; then it is determined that the television 101 is located on the leftmost side of another device (the television 102) by traversing an orientation relationship between every two devices; then it is determined that the television 102 is located on the rightmost side by traversing an orientation relationship between every two devices; and finally, it is determined that the three devices, namely the television 103, the television 101, and the television 102, are sequenced as "(1), (2), (3)", that is, the television 103, the television 101, and the television 102 are respectively arranged from left to right.

In some cases, information about an orientation relationship between some devices is redundant, and the information may not be used, or an identification result may be checked with reference to the redundant information. As shown in FIG. 11A, orientations of an overall screen group are identified based on the orientation relationship between the television 103 and the television 101 and the orientation relationship between the television 101 and the television 102. In this case, information about the orientation relationship between the television 103 and the television 102 is redundant. Optionally, the orientations of the overall screen group may be checked based on the orientation relationship between the television 103 and the television 102, so as to improve accuracy of identifying the orientations of the overall screen group.

In addition, the television 101, the television 102, and the television 103 are also spliced in an up-down manner (vertically spliced). For relative orientation relationships between the devices, refer to the foregoing related descriptions. Details are not described herein again.

For another example, it is assumed that the screen group includes nine devices: a television 101, a television 102, a television 103, a television 104, a television 105, a television 105, a television 107, a television 108, and a television 109. After the information about the orientation relationship between every two devices is identified, relative orientation relationships between all devices in the screen group may be summarized by collecting statistics on the orientation relationship between every two devices.

Figure 11B:
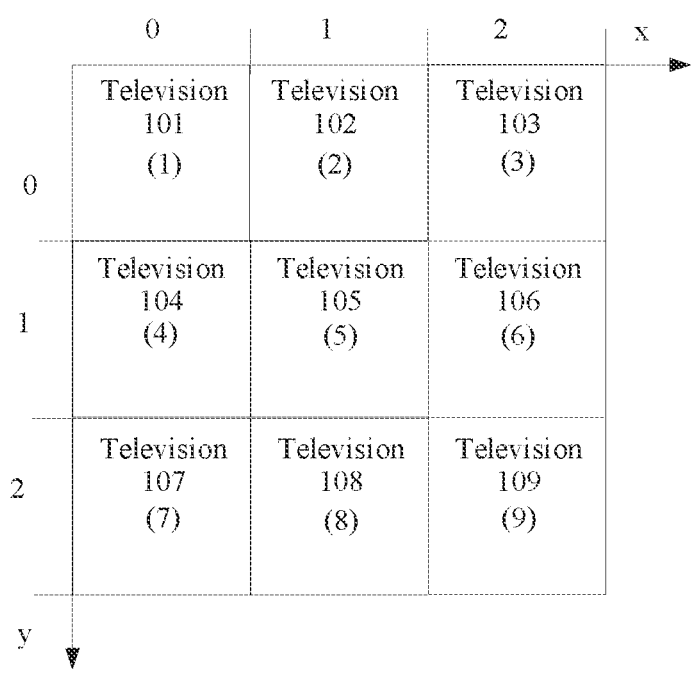
FIG. 11B is still another schematic diagram of sequencing devices according to an embodiment of this application.

As shown in FIG. 11B, for example, three devices, namely a television 101, a television 102, and a television 103 are horizontally arranged. A sequence of identifying every two devices from left to right is as follows: the television 101 and the television 102, the television 101 and the television 103, and the television 102 and the television 103. A sequencing process of determining the three devices may be as follows: It is first determined that the television 101 is located to the left of the television 102 by reading the relative orientations of the television 101 and the television 102; and then it is determined that the television 103 is located to the right of the television 101 by reading the relative orientations of the television 101 and the television 103. In this case, the relative orientations of the television 101 and the television 103 cannot be determined, and the relative orientations of the television 102 and the television 103 need to be further read. Finally, it is determined that the three devices such as the television 101, the television 102, and the television 103 are sequenced as "(1), (2), (3)", that is, the television 101, the television 102, and the television 103 are respectively arranged from left to right.

For example, three devices, namely a television 101, a television 105, and a television 109 are diagonally arranged. A sequence of identifying every two devices from upper left to lower right is as follows: the television 101 and the television 105, the television 101 and the television 109, and the television 105 and the television 109. It may be determined, by traversing relative orientations of the two devices, that the top left device is the television 101, the television 105 is located to the lower right of the television 101, and the television 109 is located to the lower right of the television 105. Therefore, it is finally determined that the three devices, namely the television 101, the television 105, and the television 109 are sequenced as "(1), (5), (9)", that is, the television 101, the television 105, and the television 109 are respectively arranged from upper left to lower right.

It should be noted that the foregoing describes an example of a method for determining relative orientation relationships between all devices in a screen group. Actually, there are a plurality of other methods for determining the relative orientation relationships between all devices in the screen group. This is not limited in this application.

In some other embodiments, step 420*a* to step 421 may be replaced with step S1:

S1: The television 101 separately obtains a photo taken by the television 102 and a photo taken by the television 103, and separately identifies an orientation relationship between the television 101 and the television 102, an orientation relationship between the television 101 and the television 103, and an orientation relationship between the television 102 and the television 103. That is, the master device may identify the orientation relationships between the devices in the screen group. In this way, the television 102 and the television 103 may not need to perform orientation identification, and power consumption of the television 102 and the television 103 may be reduced.

422*a*: The master device synchronizes the basic screen group splicing information to the television 102.

422*b*: The master device synchronizes the basic screen group splicing information to the television 103.

The master device synchronizes the basic screen group splicing information to each device in the screen group.

For example, the current basic screen group splicing information may include a quantity (for example, 3) of devices included in the screen group, the MAC address/ID of each device (for example, IDs of the television 101, the television 102, and the television 103), master-slave information (for example, the master device is the television 101, and the slave devices include the television 102 and the television 103), and inter-device orientation information (for example, the television 103, the television 101, and the television 102 are sequentially spliced from left to right).

422*c*: The television 101 separately determines display information of the television 101, the television 102, and the television 103 according to the basic screen group splicing information.

The television 101 may separately determine the display information of the television 101 and the display information of the television 102 according to the basic screen group splicing information. That is, in a running process of a screen group system, the master device may implement, based on the basic screen group splicing information, picture output display arrangement of the screen group, interface focus switching, and the like. For example, the television 101 may divide the display content of the television 101 into N parts (for example, three parts) and then allocate the N parts to the devices (for example, the television 101 itself, the television 102, and the television 103) in the screen group, where N is less than or equal to a quantity of devices included in the screen group.

422*d*: The television 101 sends the display information of the television 102 to the television 102.

422*e*: The television 101 sends the display information of the television 103 to the television 103.

422*f*: The television 101 displays a corresponding display picture according to the display information of the television 101.

422*g*: The television 102 displays a corresponding display picture according to the display information of the television 102.

422*h*: The television 103 displays a corresponding display picture according to the display information of the television 103.

In some embodiments, devices may be deleted from a screen group. Deleting devices may mean that devices are actively disassembled or removed from the current screen group, or some devices passively get offline due to power-off. For example, each device in the screen group may detect, according to the heartbeat link, whether a device is offline. Alternatively, each device in the screen group may determine, through short-range communication detection, whether a device is offline. Alternatively, in response to an operation of manually deleting a device from the screen group by the user on the management interface, information about the device deleted by the user may be marked, so that each device in the screen group determines that the device is offline.

Figure 12:
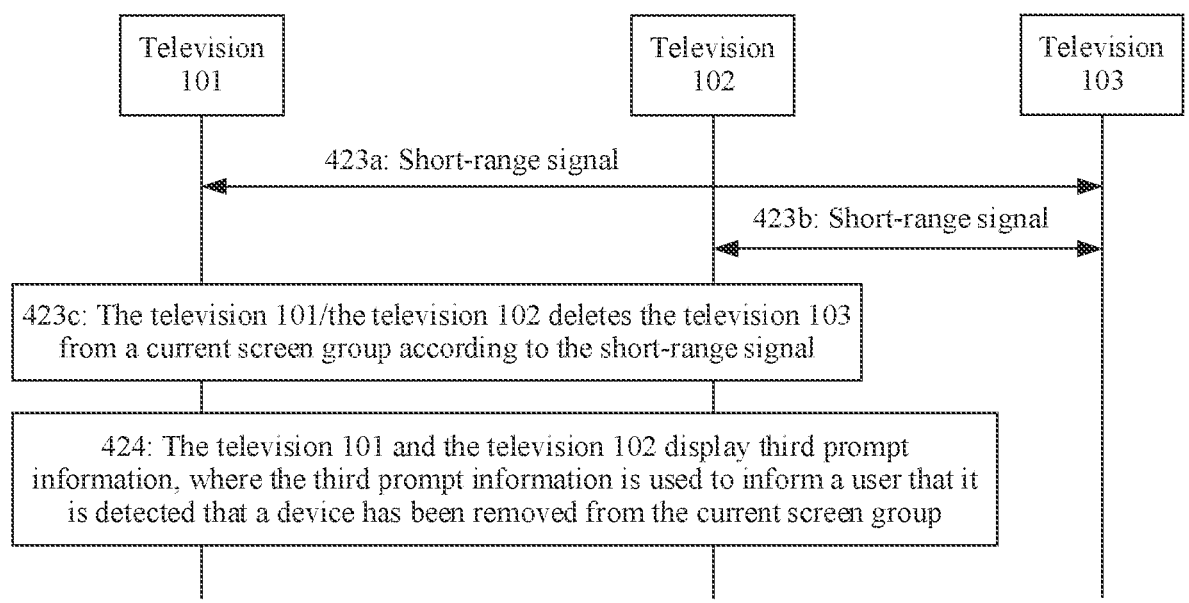
FIG. 12 is still another schematic diagram of signal interaction according to an embodiment of this application.

If the television 103 is deleted (removed) from a screen group including the television 101, the television 102, and the television 103, as shown in FIG. 12, the screen group splicing method may further include the following steps.

423*a*: Send a short-range signal between the television 101 and the television 102.

A short-range signal may be periodically sent between the television 101 and the television 102, so as to measure a distance between the television 101 and the television 102 according to the short-range signal.

423*b*: Send a short-range signal between the television 102 and the television 103.

A short-range signal may be periodically sent between the television 101 and the television 103, so as to measure a distance between the television 101 and the television 103 according to the short-range signal.

423*c*: The television 101/the television 102 deletes the television 103 from the current screen group according to the short-range signal.

For example, if the television 101 determines, through short-range signal detection, whether the television 103 is offline, the television 101 may compare a distance D2 between the television 101 and the television 103 and a corresponding maximum combination radius R2 between the television 101 and the television 103. If the television 101 determines that the distance D2 between the television 101 and the television 103 is greater than the maximum combination radius R2 between the television 101 and the television 103, that is, D2>R2, the television 101 determines that the television 101 and the television 103 are not in a splicing state, and deletes the television 103 from the screen group including the television 101, the television 102, and the television 103.

The television 102 may obtain, from the television 101, information that D2 is greater than R2, to determine that the television 103 needs to be deleted from the current screen group.

424: The television 101 and the television 102 display third prompt information, where the third prompt information is used to inform the user that it is detected that a device has been removed from the current screen group.

In some embodiments, as shown in (a) in FIG. 3G, the screen group including the television 101, the television 102, and the television 103 may jointly display corresponding display content. If the television 103 needs to be deleted from the screen group including the television 101, the television 102, and the television 103 (for example, the television 103 is removed after the television 101, the television 102, and the television 103 are spliced together), for example, as shown in (b) in FIG. 3G, the television 101 and the television 102 each may display a pop-up box 307 to inform the user that it is detected that the device 123*xxx* has been removed from the current screen group. The pop-up box 307 may include an OK button 308. In response to an operation of clicking the OK button 308 by the user, the television 101 determines that information in the pop-up box 307 is known to the user, and may hide the pop-up box 307. Alternatively, the pop-up box 307 may be automatically hidden after being displayed for a few seconds (for example, 2 s), to avoid affecting the display content of the television 101 and the television 102.

In some other embodiments, when detecting that the television 103 is removed, the television 101/the television 102 may inform the user that a device has been removed; and the device may be removed from the current screen group in response to an operation of determining, by the user, to remove the device. For example, as shown in (a) in FIG. 3H, a screen group including the television 101, the television 102, and the television 103 may jointly display corresponding display content. If the television 103 needs to be deleted from the screen group including the television 101, the television 102, and the television 103 (for example, the television 103 is removed after the television 101, the television 102, and the television 103 are spliced together), for example, as shown in (b) in FIG. 3H, the television 101, the television 102, and the television 103 may maintain previous display content of the television 101, the television 102, and the television 103, and the television 101 and the television 102 each may display a pop-up box 309, so that the user can determine whether to remove the device 123*xxx* from the current screen group. The pop-up box 309 may include an OK button 310 and a Cancel button 311. The television 103 is removed from the screen group in response to an operation of clicking the OK button 310 by the user. As shown in (c) in FIG. 3H, the television 101 and the television 102 may jointly display corresponding display content (the display content of the television 101 and the display content of the television 102 may be determined by the processor of the television 101 (the master device)), and the television 103 independently displays corresponding display content (the display content of the television 103 may be determined by the processor of the television 103). In addition, if the user clicks the Cancel button 311, as shown in (b) in FIG. 3H, the television 101, the television 102, and the television 103 may maintain the previous display content.

It should be noted that, if the removed device is a master device in the current screen group, the remaining devices in the screen group may re-elect a master device.

The master device updates the basic screen group splicing information and synchronizes the information to all devices in the screen group, so that each device in the screen group knows which device is removed from the screen group. For example, the updated current basic screen group splicing information may include the quantity (for example, 2) of the devices included in the screen group, the MAC address/ID of each device (for example, IDs of the television 101 and the television 102), the master-slave information (for example, the master device is the television 101, and the slave device is the television 102), and the information about the orientation relationship between devices (for example, the television 101 and the television 102 are in a left-right splicing state). In the running process of the screen group system, the master device may implement, based on the basic screen group splicing information, picture output display arrangement, interface focus switching, and the like. For example, the television 101 may divide the display content of the television 101 into N parts (for example, two parts), and then allocate the N parts to each device (for example, the television 101 itself and the television 102) in the screen group, where N is less than or equal to a quantity of devices included in the screen group.

It should be noted that, when a device is removed from a screen group, it may be considered that the screen group is regrouped, and relative orientation relationships between devices in the screen group may be re-determined, for example, steps 410 to 414 may be performed again.

According to the method provided in this embodiment of this application, in a screen combination/splicing process, a camera of each device may be used to take a photo, and the photos taken by the devices are identified and compared. For example, the orientations of the photos in which the overlapping area is located may be determined, so that a relative orientation relationship between the two devices is identified, and a user does not need to perform manual setting, thereby improving user experience. In addition, in this embodiment of this application, a distance between devices may be dynamically monitored, an intention of combining the devices may be automatically identified, and a screen assembly program may be started, so that the user does not need to manually set the screen assembly program, which is more intelligent and convenient.

Figure 13:
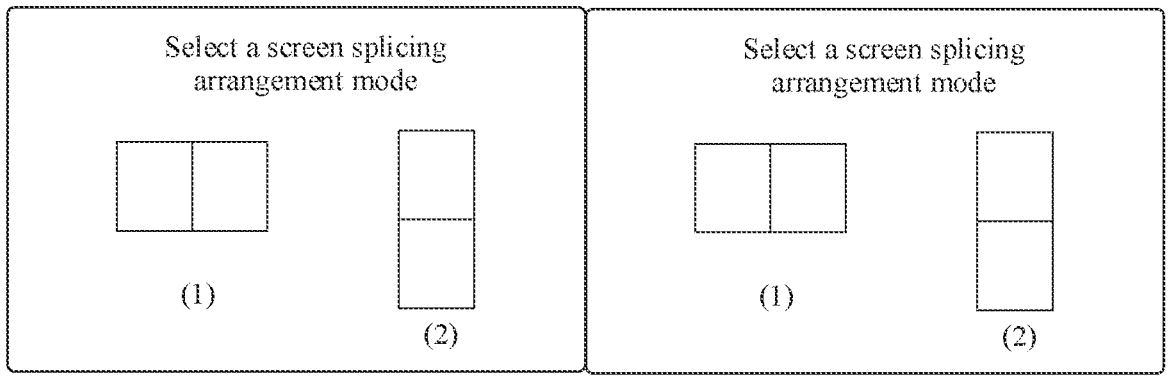
FIG. 13 is still another schematic diagram of displaying according to an embodiment of this application.
Figure 13:
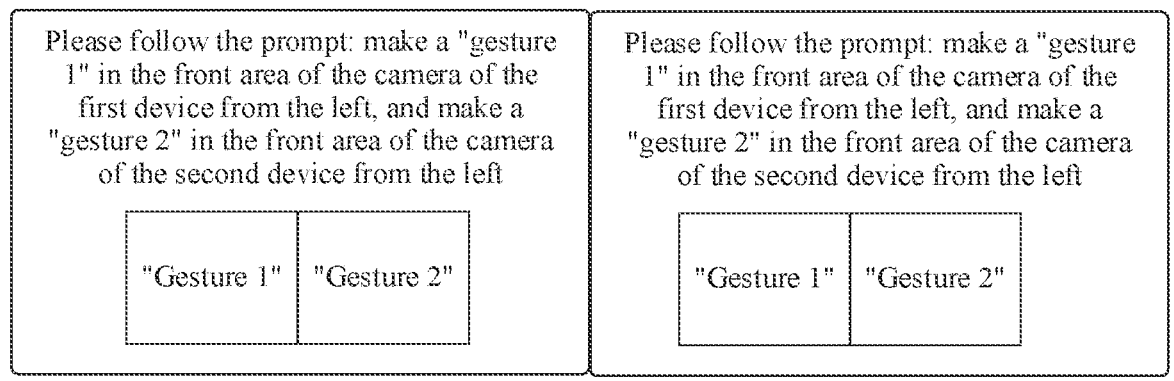

In addition, in some embodiments, the orientation relationships between the devices may be determined through human-computer interaction. For example, different actions (gestures) or objects may be used in front areas of cameras of the television 101 and the television 102 to indicate orientations of different devices. For example, as shown in (a) in FIG. 13, first, the television 101 and the television 102 may prompt the user to select arrangement manner of the devices, where the arrangement manner of the devices may include, for example, (1) up-down arrangement; and (2) left-right arrangement. As shown in (b) in FIG. 13, in response to the user's selection of left-right arrangement in (2), the television 101 and the television 102 may prompt the user to make a "gesture 1" in the front area of the camera of the first device from the left, and make a "gesture 2" in the front area of the camera of the second device from the left. After reading the prompt, the user may make the "gesture 1" in the front area of the camera of the first device (for example, the television 101) from the left, and make the "gesture 2" in the front area of the camera of the second device (for example, the television 102) from the left. The television 101 may detect whether a hand of a person appears in the field of view of the camera; and if it is determined that the hand of the person appears, an image may be photographed. In addition, the television 102 may detect whether a hand of a person appears in the field of view of the camera; and if it is determined that the hand of the person appears, an image may be photographed. The television 101 determines whether a gesture in the image photographed by the television 101 matches the "gesture 1" or the "gesture 2"; and if the gesture matches the "gesture 1", it is determined that the television 101 is the first device from the left. The television 102 may determine whether a gesture in the image photographed by the television 102 matches the "gesture 1" or the "gesture 2"; and if the gesture matches the "gesture 2", it is determined that the television 102 is the second device from the left. In this way, it may be determined that the television 101 is located to the left of the television 102. In this way, engagement and fun of the user in a screen splicing process can be improved.

Figure 14:
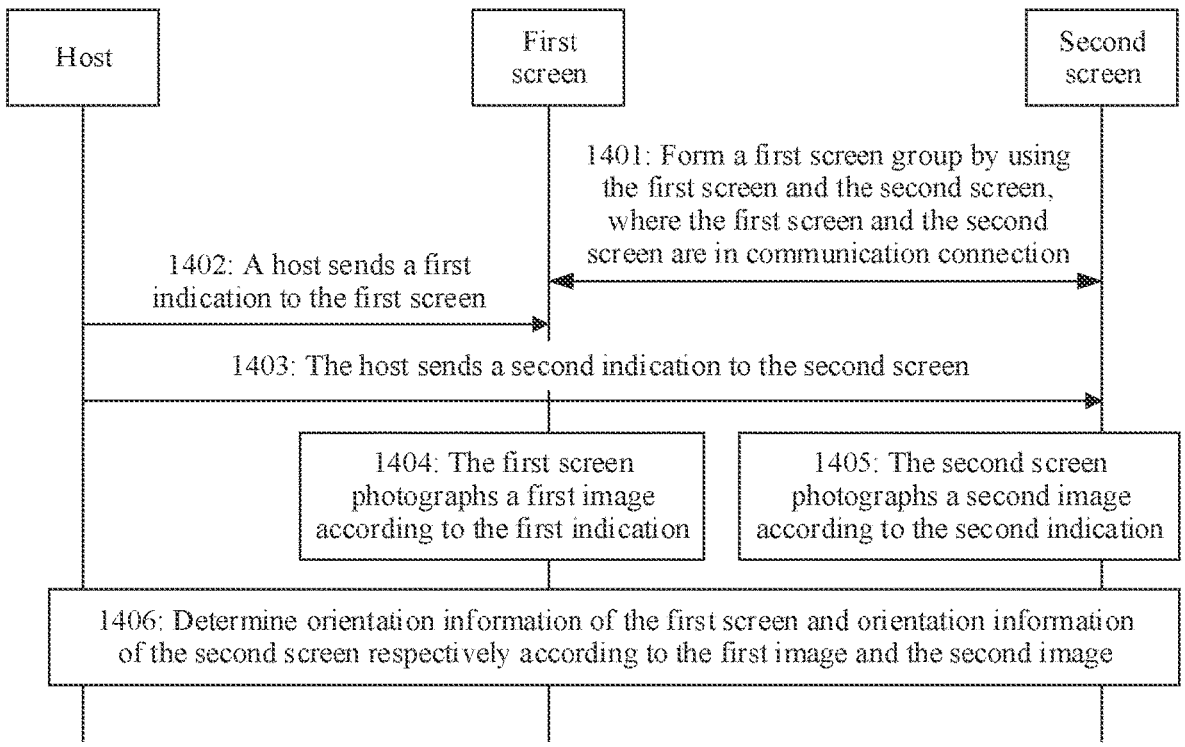
FIG. 14 is still another schematic diagram of signal interaction according to an embodiment of this application.

As shown in FIG. 14, an embodiment of this application provides a screen combination method which may be applied to a screen splicing system. The screen splicing system includes at least two screens and a host, where the at least two screens include a first screen and a second screen, and the host is integrated into the first screen or the second screen; or the host is independent of the first screen or the second screen. The method includes:

1401: Form a first screen group by using the first screen and the second screen, where the first screen and the second screen are in communication connection.

Optionally, before the first screen and the second screen form a first screen group, the method further includes: the first screen and the second screen send a first short-range signal to each other at a preset frequency, and the first screen or the second screen determines a distance between the first screen and the second screen according to a received signal strength indicator RSSI of the first short-range signal transmitted between the first screen and the second screen; and when the distance between the first screen and the second screen is less than or equal to a maximum combination radius corresponding to the first screen and the second screen, the first screen and the second screen form the first screen group, where the maximum combination radius corresponding to the first screen and the second screen is determined according to sizes of the first screen and the second screen and positions of antennas.

Optionally, before the first screen and the second screen form the first screen group, the first screen and/or the second screen may display first prompt information, where the first prompt information is used to inform the user that a nearby device is detected and prompt the user to determine whether to perform screen splicing.

1402: The host sends a first indication to the first screen.

In some embodiments, if the host is disposed in the first screen (for example, the television 101), the first indication may be a signal sent by the host to a camera of the television 101.

1403: The host sends a second indication to the second screen.

In some embodiments, if the host is disposed in the first screen (for example, the television 101), the television 101 may send a second indication to the second screen (for example, the television 102). For the second indication, refer to the foregoing first notification message. Details are not described herein again.

1404: The first screen photographs a first image according to the first indication.

The first image refers to an image (a photo/picture) photographed by the first screen (for example, the television 101).

1405: The second screen photographs a second image according to the second indication.

The second image refers to an image (a photo/picture) photographed by the second screen (for example, the television 102).

1406: Determine orientation information of the first screen and orientation information of the second screen respectively according to the first image and the second image.

In some embodiments, the determining orientation information of the first screen and orientation information of the second screen respectively according to the first image and the second image includes: the first screen sends the first image to the second screen; the second screen sends the second image to the first screen; the first screen determines the orientation information of the first screen according to the first image; the second screen determines the orientation information of the second screen according to the second image; the first screen and the second screen respectively send the orientation information determined by the first screen and the orientation information determined by the second screen to the host; and the host sends the orientation information of the first screen according to the orientation information determined by the first screen, and determines the orientation information of the second screen according to the orientation information determined by the second screen.

In some other embodiments, the determining orientation information of the first screen and orientation information of the second screen respectively according to the first image and the second image includes: the first screen sends the first image to the host; the second screen sends the second image to the host; and the host determines the orientation information of the first screen and the orientation information of the second screen respectively according to the first image and the second image.

In a possible design, the determining orientation information of the first screen and orientation information of the second screen respectively according to the first image and the second image includes: performing image matching on the first image and the second image according to an image matching algorithm, to determine an overlapping area between the first image and the second image; and determining an orientation of the first screen relative to the second screen according to orientations of the overlapping area in the first image and the second image. The image matching algorithm includes at least one of a scale-invariant feature transform SIFT algorithm, a speeded up robust features SURF algorithm, or a fast nearest neighbor search algorithm.

For example, if the overlapping area is located in a lower half area of the first image and is located in an upper half area of the second image, determining that the first screen is located above the second screen; or if the overlapping area is located at a lower left corner of the first image and is located at an upper right corner of the second image, determining that the first screen is located to the upper right of the second screen; or if the overlapping area is located in a left half area of the first image and is located in a right half area of the second image, determining that the first screen is located to the right of the second screen; or if the overlapping area is located at an upper left corner of the first image and is located at a lower right corner of the second image, determining that the first screen is located to the lower right of the second screen; or if the overlapping area is located in an upper half area of the first image and is located in a lower half area of the second image, determine that the first screen is located below the second screen; or if the overlapping area is located at an upper right corner of the first image and is located at a lower left corner of the second image, determining that the first screen is located to the lower left of the second screen; or if the overlapping area is located in a right half area of the first image and is located in a left half area of the second image, determining that the first screen is located to the left of the second screen; or if the overlapping area is located in a lower right area of the first image and is located in an upper left area of the second image, determining that the first screen is located to the upper left of the second screen.

In another possible design, if it is determined that the first image and the second image include a target object, determining the orientation of the first screen relative to the second screen according to orientations of the target object in the first image and the second image.

In still some other embodiments, before the first screen photographs a first image according to the first indication, and the second screen photographs the second image according to the second indication, the method further includes; the host sends layout information to the first screen and the second screen, where the layout information includes at least one combination mode; and the host sends operation information to the first screen and the second screen in response to an operation of selecting one combination mode from the at least one combination mode by the user, where the first screen and/or the second screen indicate, based on the operation information, the user to perform a first gesture or action in a first position and perform a second gesture or action in a second position. The determining orientation information of the first screen and orientation information of the second screen respectively according to the first image and the second image includes: if it is determined that an area that is in the first image and that includes the first gesture or action is greater than or equal to a preset threshold, determining that the first screen is located in the first position; or if it is determined that an area that is in the second image and that includes the second gesture or action is greater than or equal to the preset threshold, determining that the second screen is located in the second position.

Optionally, the first screen or the second screen scores resource statuses of the first screen and the second screen, where the resource statuses include at least one of a processing capability of a central processing unit CPU, a storage capability of a read-only memory ROM, or a storage capability of a random access memory RAM; and if a score of the first screen is higher than the score of the second screen, the host is integrated into the first screen; or if a score of the second screen is higher than a score of the first screen, the host is integrated into the second screen.

Optionally, the host determines display information corresponding to the first screen and display information corresponding to the second screen respectively according to the orientation information of the first screen and the orientation information of the second screen; the host sends the display information corresponding to the first screen to the first screen; the first screen displays a corresponding display picture according to the display information corresponding to the first screen; the host sends the display information corresponding to the second screen to the second screen; and after receiving the display information corresponding to the second screen, the second screen displays a corresponding display picture according to the display information corresponding to the second screen.

Optionally, the screen splicing system further includes a third screen, and the method further includes: the first screen and the third screen send a second short-range signal to each other; the second screen and the third screen send a third short-range signal to each other; determining a distance between the first screen and the third screen according to an RSSI of the second short-range signal; determining a distance between the second screen and the third screen according to an RSSI of the third short-range signal; and when the distance between the first screen and the third screen is less than or equal to a maximum combination radius corresponding to the first screen and the third screen, forming a second screen group by using the first screen, the second screen, and the third screen, where the maximum combination radius corresponding to the first screen and the third screen is determined according to sizes of the first screen and the third screen and positions of antennas; or when the distance between the second screen and the third screen is less than or equal to a maximum combination radius corresponding to the second screen and the third screen, forming a second screen group by using the first screen, the second screen, and the third screen, where the maximum combination radius corresponding to the second screen and the third screen is determined according to sizes of the second screen and the third screen and positions of antennas.

Optionally, the first screen and/or the second screen display/displays second prompt information, where the second prompt information is used to inform the user that a nearby device is detected and prompt the user to determine whether to perform screen splicing.

In a possible design, if the first condition is met, the method further includes: displaying third prompt information on the first screen and/or the second screen, where the third prompt information is used to inform the user that the third screen has been removed from the current screen group.

The first condition includes: a heartbeat connection between the third screen and the first screen is disconnected, or a heartbeat connection between the third screen and the second screen is disconnected; or the host receives an operation of deleting the third screen by the user; or the distance between the first screen and the third screen is greater than the maximum combination radius corresponding to the first screen and the third screen; or the distance between the second screen and the third screen is greater than the maximum combination radius corresponding to the second screen and the third screen.

After the third screen is removed from the current screen group, the method further includes: the host re-determines the display information corresponding to the first screen and the display information corresponding to the second screen respectively according to the orientation information of the first screen and the orientation information of the second screen.

It should be noted that the first screen in the embodiment in FIG. 14 may be the television 101 in the foregoing embodiments, the second screen may be the television 102, and the third screen may be the television 103. For a part that is not described in detail in the embodiment in FIG. 14, refer to the foregoing embodiments. Details are not described herein again.

Based on the method provided in this embodiment of this application, in a screen combination/splicing process, a camera built in a device (the first screen or the second screen) may be used to take photos, and the photos taken by the devices may be identified and compared. For example, the orientations of the photos in which the overlapping area is located may be determined, so as to identify a relative orientation relationship between the two devices, and the user does not need to perform manual setting, thereby improving user experience. In addition, in this embodiment of this application, a distance between devices may be dynamically monitored, an intention of combining the devices may be automatically identified, and a screen assembly program may be started, so that the user does not need to manually set the screen assembly program, which is more intelligent and convenient.

Figure 15:
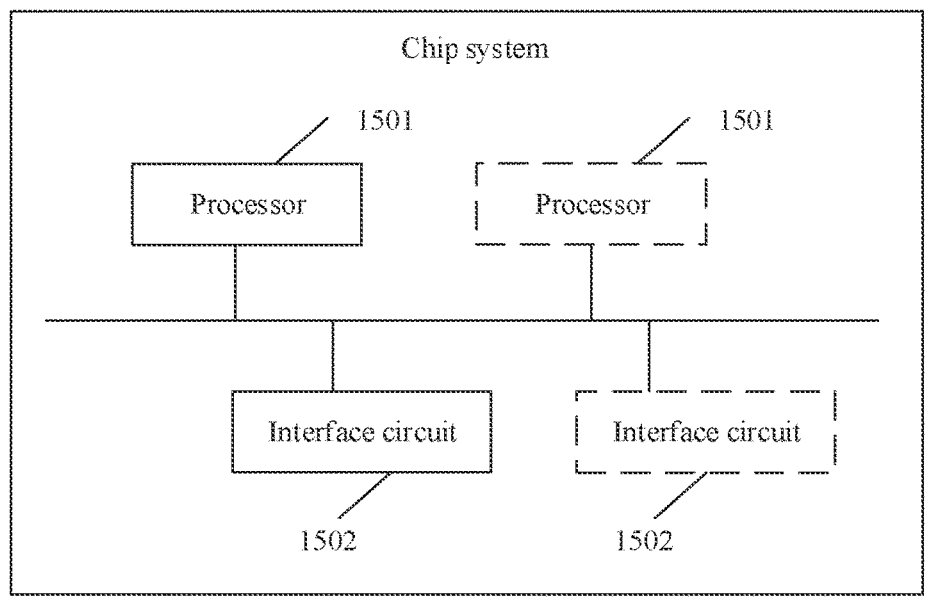
FIG. 15 is a schematic diagram of a structure of a chip system according to an embodiment of this application.

Another embodiment of this application provides a chip system. As shown in FIG. 15, the chip system includes at least one processor 1501 and at least one interface circuit 1502. The processor 1501 and the interface circuit 1502 may be interconnected by using a line. For example, the interface circuit 1502 may be configured to receive a signal from another apparatus (for example, a memory of a first screen, a memory of a second screen, or a memory of a third screen). For another example, the interface circuit 1502 may be configured to send a signal to another apparatus (for example, the processor 1501).

For example, the interface circuit 1502 may read instructions stored in a memory of a device, and send the instructions to the processor 1501. When the instructions are executed by the processor 1501, the first screen or the second screen (the screen 110 shown in FIG. 2A) is enabled to perform the steps in the foregoing embodiments.

Certainly, the chip system may further include another discrete device. This is not specifically limited in this embodiment of this application.

Some other embodiments of this application provide a first screen (the screen 110 shown in FIG. 2A). The first screen may include a communication module, a memory, and one or more processors. The communication module and the memory are coupled to the processor. The memory is configured to store computer program code, and the computer program code includes computer instructions.

An embodiment of this application further provides a computer-readable storage medium. The computer-readable storage medium includes computer instructions. When the computer instructions are run on a first screen or a second screen (the screen 110 shown in FIG. 2A), the screen 110 is enabled to perform the functions or steps performed by the television 101 or the television 102 in the foregoing method embodiments.

An embodiment of this application further provides a computer program product. When the computer program product runs on a computer, the computer is enabled to perform the functions or steps performed by the first screen (for example, the television 101) or the second screen (for example, the television 102) in the foregoing method embodiments.

The foregoing descriptions about implementations allow a person skilled in the art to clearly understand that, for convenient and brief description, division of the foregoing functional modules is taken as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed in a plurality of different places. Some or all of the units may be selected according to actual needs to achieve the purpose of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   sending, to a first screen of a screen splicing system, a first indication instructing the first screen to photograph a first image;
   sending, to a second screen of the screen splicing system, a second indication instructing the second screen to photograph a second image, wherein the first screen and the second screen are in communication connection; and
   determining first orientation information of the first screen according to the first image and second orientation information of the second screen according to the second image,
   wherein the first screen is located in a first position when a first area that is in the first image and that comprises a first gesture or a first action is greater than or equal to a preset threshold, and
   wherein the second screen is located in a second position when a second area that is in the second image and that comprises a second gesture or a second action is greater than or equal to the preset threshold.

2. The method of claim 1, wherein determining the first orientation information and the second orientation information comprises:
   receiving, from the first screen, the first image;
   receiving, from the second screen, the second image; and
   determining the first orientation information according to the first image and the second orientation information according to the second image.

3. The method of claim 1, wherein determining the first orientation information and the second orientation information comprises:
   performing, according to an image matching algorithm, image matching on the first image and the second image to determine an overlapping area between the first image and the second image; and
   determining an orientation of the first screen relative to the second screen according to orientations of the overlapping area in the first image and the second image.

4. The method of claim 3, wherein determining the orientation comprises:
   determining that the first screen is located above the second screen when the overlapping area is located in a lower half area of the first image and is located in an upper half area of the second image;
   determining that the first screen is located to an upper right of the second screen when the overlapping area is located at a lower left corner of the first image and is located at an upper right corner of the second image;
   determining that the first screen is located to a right of the second screen when the overlapping area is located in a left half area of the first image and is located in a right half area of the second image;
   determining that the first screen is located to a lower right of the second screen when the overlapping area is located at an upper left corner of the first image and is located at a lower right corner of the second image;
   determining that the first screen is located below the second screen when the overlapping area is located in an upper half area of the first image and is located in a lower half area of the second image;
   determining that the first screen is located to a lower left of the second screen when the overlapping area is located at an upper right corner of the first image and is located at a lower left corner of the second image;
   determining that the first screen is located to a left of the second screen when the overlapping area is located in a right half area of the first image and is located in a left half area of the second image; and
   determining that the first screen is located to an upper left of the second screen when the overlapping area is located in a lower right area of the first image and is located in an upper left area of the second image.

5. The method of claim 3, wherein the image matching algorithm comprises a scale-invariant feature transform (SIFT) algorithm.

6. The method of claim 1, wherein determining the first orientation information and the second orientation information comprises determining an orientation of the first screen relative to the second screen according to orientations of a target object in the first image and the second image when determining that the first image and the second image comprise the target object.

7. The method of claim 1, wherein before photographing the first image, the method further comprises:
   sending, to the first screen and the second screen, layout information comprising at least one combination mode; and
   sending, to the first screen and the second screen, operation information in response to an operation of selecting one combination mode from the at least one combination mode by a user, wherein the operation information instructs the user to perform the first gesture or the first action in the first position and perform the second gesture or the second action in the second position.

8. The method of claim 1, further comprising:
   determining first display information corresponding to the first screen and second display information corresponding to the second screen respectively according to the first orientation information and the second orientation information;
   sending, to the first screen, the first display information; and
   sending, to the second screen, the second display information.

9. The method of claim 3, wherein the image matching algorithm comprises a speeded up robust features (SURF) algorithm or a fast nearest neighbor search algorithm.

10. A screen splicing system, comprising:
    a first screen;
    a second screen communicatively coupled to the first screen; and
    a host coupled to the first screen and the second screen and configured to:
       send, to the first screen, a first indication instructing the first screen to photograph a first image;
       send, to the second screen, a second indication instructing the second screen to photograph a second image; and
       determine first orientation information of the first screen according to the first image and second orientation information of the second screen according to the second image, wherein the first screen is located in a first position when a first area that is in the first image and that comprises a first gesture or a first action is greater than or equal to a preset threshold, and wherein the second screen is located in a second position when a second area that is in the second image and that comprises a second gesture or a second action is greater than or equal to the preset threshold.

11. The screen splicing system of claim 10, wherein the host is further configured to:
receive, from the first screen, the first image;
receive, from the second screen, the second image; and
determine first orientation information according to the first image and second orientation information according to the second image.

12. The screen splicing system of claim 10, wherein the host is further configured to:
perform, according to an image matching algorithm, image matching on the first image and the second image to determine an overlapping area between the first image and the second image; and
determine an orientation of the first screen relative to the second screen according to orientations of the overlapping area in the first image and the second image.

13. The screen splicing system of claim 12, wherein the host is further configured to:
determine that the first screen is located above the second screen when the overlapping area is located in a lower half area of the first image and is located in an upper half area of the second image;
determine that the first screen is located to an upper right of the second screen when the overlapping area is located at a lower left corner of the first image and is located at an upper right corner of the second image;
determine that the first screen is located to a right of the second screen when the overlapping area is located in a left half area of the first image and is located in a right half area of the second image;
determine that the first screen is located to a lower right of the second screen when the overlapping area is located at an upper left corner of the first image and is located at a lower right corner of the second image;
determine that the first screen is located below the second screen when the overlapping area is located in an upper half area of the first image and is located in a lower half area of the second image;
determine that the first screen is located to a lower left of the second screen when the overlapping area is located at an upper right corner of the first image and is located at a lower left corner of the second image;
determine that the first screen is located to a left of the second screen when the overlapping area is located in a right half area of the first image and is located in a left half area of the second image; and
determine that the first screen is located to an upper left of the second screen when the overlapping area is located in a lower right area of the first image and is located in an upper left area of the second image.

14. The screen splicing system of claim 12, wherein the image matching algorithm comprises a scale-invariant feature transform (SIFT) algorithm.

15. The screen splicing system of claim 10, wherein the host is further configured to determine an orientation of the first screen relative to the second screen according to orientations of a target object in the first image and the second image when determining that the first image and the second image comprise the target object.

16. The screen splicing system of claim 10, wherein the host is further configured to:
send, to the first screen and the second screen, layout information comprising at least one combination mode; and
send, to the first screen and the second screen, operation information in response to an operation of selecting one combination mode from the at least one combination mode by a user, wherein the operation information instructs the user to perform the first gesture or the first action in the first position and perform the second gesture or the second action in the second position.

17. The screen splicing system of claim 10, wherein the host is further configured to:
determine first display information corresponding to the first screen and second display information corresponding to the second screen respectively according to the first orientation information and the second orientation information;
send, to the first screen, the first display information; and
send, to the second screen, the second display information.

18. The screen splicing system of claim 12, wherein the image matching algorithm comprises a speeded up robust features (SURF) algorithm.

19. The screen splicing system of claim 12, wherein the image matching algorithm comprises a fast nearest neighbor search algorithm.

20. A computer program product comprising computer-executable instructions that are stored on a non-transitory computer storage medium and that, when executed by one or more processors, cause a host of a screen splicing system to:
send, to a first screen of the screen splicing system, a first indication instructing the first screen to photograph a first image;
send, to a second screen of the screen splicing system, a second indication instructing the second screen to photograph a second image, wherein the first screen and the second screen are in communication connection; and
determine first orientation information of the first screen according to the first image and second orientation information of the second screen according to the second image,
wherein the first screen is located in a first position when a first area that is in the first image and that comprises a first gesture or a first action is greater than or equal to a preset threshold, and
wherein the second screen is located in a second position when a second area that is in the second image and that comprises a second gesture or a second action is greater than or equal to the preset threshold.

* * * * *